(12) United States Patent
Okuike

(10) Patent No.: US 11,343,441 B2
(45) Date of Patent: May 24, 2022

(54) IMAGING DEVICE AND APPARATUS

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/639,341

(22) PCT Filed: May 28, 2018

(86) PCT No.: PCT/JP2018/020337
§ 371 (c)(1),
(2) Date: Feb. 14, 2020

(87) PCT Pub. No.: WO2019/039022
PCT Pub. Date: Feb. 28, 2019

(65) Prior Publication Data
US 2021/0029290 A1 Jan. 28, 2021

(30) Foreign Application Priority Data
Aug. 21, 2017 (JP) .............................. JP2017-158538

(51) Int. Cl.
*H04N 5/235* (2006.01)
*G08G 1/0962* (2006.01)
(Continued)

(52) U.S. Cl.
CPC .......... *H04N 5/2357* (2013.01); *B60R 11/04* (2013.01); *G06T 7/20* (2013.01); *G06V 10/56* (2022.01);
(Continued)

(58) Field of Classification Search
CPC .................................................... H04N 5/2357
See application file for complete search history.

(56) References Cited

U.S. PATENT DOCUMENTS

| | | | | |
|---|---|---|---|---|
| 10,200,671 B2* | 2/2019 | Dahi | ....................... | G06T 7/593 |
| 2004/0233280 A1* | 11/2004 | Aoyama | ................. | G06T 5/006 |
| | | | | 348/135 |

(Continued)

FOREIGN PATENT DOCUMENTS

| | | |
|---|---|---|
| CN | 101394483 A | 3/2009 |
| CN | 102192729 A | 9/2011 |

(Continued)

OTHER PUBLICATIONS

Chinese Office Action dated Mar. 1, 2021 for corresponding Chinese Application No. 201880050789.8.

*Primary Examiner* — Clifford Hilaire
(74) *Attorney, Agent, or Firm* — Michael Best & Friedrich LLP

(57) ABSTRACT

Provided is an imaging device and an apparatus that can obtain an appropriate captured image that allows recognition of an object even when a flicker phenomenon is occurring. Provided is an imaging device including a detection unit that detects a blinking object or an object lit by a blinking illuminator, a tracking unit that performs tracking on the detected object, an estimation unit that estimates period information of the blinking, on the basis of a plurality of imaging frames of the tracked object, and a signal generation unit that generates a timing signal for capturing the object, on the basis of the estimation result.

17 Claims, 17 Drawing Sheets

(51) Int. Cl.
*H04N 5/225* (2006.01)
*H04N 5/247* (2006.01)
*G06V 10/56* (2022.01)
*G06V 20/58* (2022.01)
*B60R 11/04* (2006.01)
*G06T 7/20* (2017.01)

(52) U.S. Cl.
CPC ....... *G06V 20/582* (2022.01); *G08G 1/09623* (2013.01); *H04N 5/2258* (2013.01); *H04N 5/2353* (2013.01); *H04N 5/247* (2013.01); *B60R 2300/105* (2013.01); *G06T 2207/30252* (2013.01)

(56) References Cited

U.S. PATENT DOCUMENTS

| | | | |
|---|---|---|---|
| 2005/0185834 A1* | 8/2005 | Kristjansson | G06T 7/285 |
| | | | 382/154 |
| 2011/0221929 A1 | 9/2011 | Miyahara et al. | |
| 2013/0271623 A1 | 10/2013 | Jo | |
| 2015/0138392 A1* | 5/2015 | Sugawara | H04N 5/2357 |
| | | | 348/226.1 |
| 2015/0222854 A1* | 8/2015 | Lachapelle | H04N 7/152 |
| | | | 348/14.08 |
| 2017/0041591 A1* | 2/2017 | Korogi | G06K 9/00825 |
| 2018/0091720 A1* | 3/2018 | Edwards | H04N 5/2357 |

FOREIGN PATENT DOCUMENTS

| | | |
|---|---|---|
| CN | 104601904 A | 5/2015 |
| CN | 104660893 A | 5/2015 |
| CN | 104717435 A | 6/2015 |
| CN | 105847705 A | 8/2016 |
| EP | 3089442 A1 | 11/2016 |
| JP | 09-181953 A | 7/1997 |
| JP | 2001-257920 A | 9/2001 |
| JP | 2003-109172 A | 4/2003 |
| JP | 2006-245875 A | 9/2006 |
| JP | 2008134844 A | 6/2008 |
| JP | 2008-211442 A | 9/2008 |
| JP | 2010-187110 A | 8/2010 |
| JP | 2016-197795 A | 11/2016 |

* cited by examiner

IMAGING DEVICE AND APPARATUS

TECHNICAL FIELD

The present disclosure relates to an imaging device and an apparatus.

BACKGROUND ART

In recent years, to provide secure and safe automobiles, the development of driving safety support systems that support drivers' driving and automatic driving has been promoted. In such development, it is required to recognize various objects such as traffic signs, vehicles, and passers-by present around a vehicle with a vehicle-mounted imaging device or the like. For example, one of the objects to be recognized may be a self-luminous traffic sign using light emitting diodes (LEDs).

By the way, LEDs have periodic flicker, though to an extent not perceived by humans, due to the frequency of an AC source that supplies power to the LEDs, or the like. Such flicker is called a flicker phenomenon. An example of an imaging device that captures an object having such a flicker phenomenon is disclosed in Patent Document 1 below.

Furthermore, when the self-luminous traffic sign is imaged by the vehicle-mounted imaging device, the self-luminous traffic sign may be imaged at the moment when the LEDs are turned off due to the flicker phenomenon, and the information of the sign indicated by the LEDs of the self-luminous traffic sign may not be able to be recognized from the obtained captured image. Thus, as a measure against the above-described phenomenon, a method is conceivable by which to increase the exposure time of the imaging device to an integral multiple of the period of the flicker phenomenon of the LEDs to ensure capturing of the LEDs when the LEDs are being lit.

CITATION LIST

Patent Document

Patent Document 1: Japanese Patent Application Laid-Open No. 2008-211442

SUMMARY OF THE INVENTION

Problems to be Solved by the Invention

However, in a case where the exposure time is increased to an integral multiple of the period of the flicker phenomenon of the LEDs in the vehicle-mounted imaging device, a motion blur may occur on a captured image (also called a "subject blur") or saturation (also called a "whiteout") may occur, and thus an appropriate captured image that allows recognition of the sign information may not be able to be obtained.

Therefore, in view of the above circumstances, the present disclosure proposes a new and improved imaging device and apparatus that can obtain an appropriate captured image that allows recognition of an object even when a flicker phenomenon is occurring.

Solutions to Problems

According to the present disclosure, provided is an imaging device including a detection unit that detects a blinking object or an object lit by a blinking illuminator, a tracking unit that performs tracking on the detected object, an estimation unit that estimates period information of the blinking, on the basis of a plurality of imaging frames of the tracked object, and a signal generation unit that generates a timing signal for capturing the object, on the basis of the estimation result.

Further, according to the present disclosure, provided is an apparatus that is spatially movable or can analyze a blinking object or an object lit by a blinking illuminator, and is equipped with an imaging device including a detection unit that detects the object, a tracking unit that performs tracking on the detected object, an estimation unit that estimates period information of the blinking, on the basis of a plurality of imaging frames of the tracked object, and a signal generation unit that generates a timing signal for capturing the object, on the basis of an estimation result.

Effects of the Invention

As described above, according to the present disclosure, it is possible to provide an imaging device and an apparatus that can obtain an appropriate captured image that allows recognition of an object even when a flicker phenomenon is occurring.

Note that the above effects are not necessarily limiting, and any of the effects described in the present description, or other effects that can be understood from the present description may be achieved together with the above effects or in place of the above effects.

MODE FOR CARRYING OUT THE INVENTION

Figure 1:
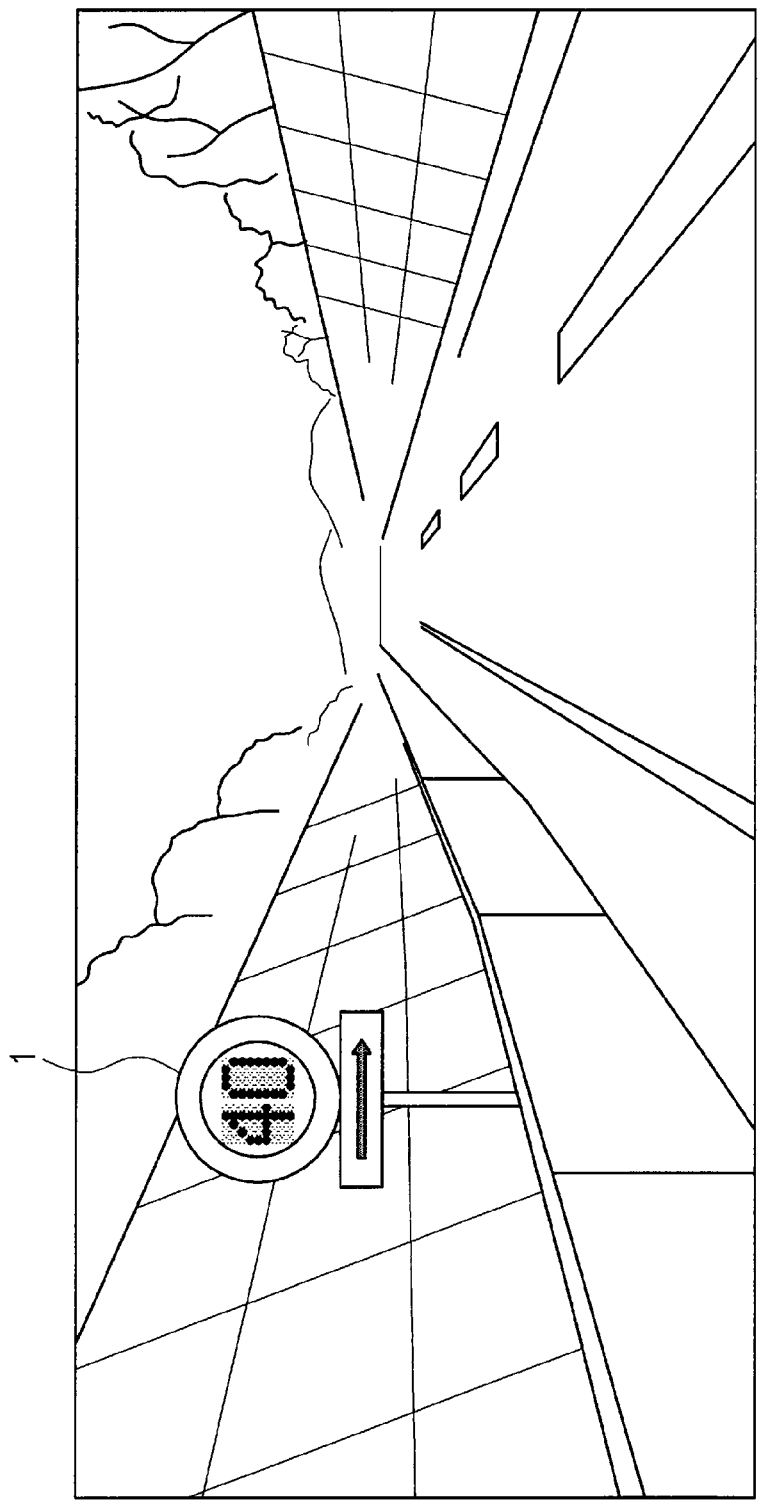
FIG. 1 is an explanatory diagram for explaining the background of the present disclosure.

Hereinafter, preferred embodiments of the present disclosure will be described in detail with reference to the accompanying drawings. Note that in the description and drawings, the same reference numerals are assigned to components having substantially the same functional configurations, to avoid duplicated explanation.

Furthermore, in the description and drawings, there are cases where a plurality of components having substantially the same or similar functional configuration is distinguished by adding different numerals to the end of the same reference numeral. However, in a case where it is not necessary to particularly distinguish a plurality of components having substantially the same or similar functional configuration from each other, only the same reference numeral is assigned. Furthermore, there are cases where similar components in different embodiments are distinguished by adding different alphabets to the end of the same reference numeral. However, in a case where it is not necessary to particularly distinguish similar components from each other, only the same reference numeral is assigned.

Note that the description will be made in the following order.

1. Background that has caused inventors to create embodiments of present disclosure
2. First Embodiment
2.1 Configuration of imaging device
2.2 Outline of imaging method
2.3 Detection of object (step S100)
2.4 Tracking of object (step S200)
2.5 Estimation of period information (step S300)
2.6 Generation of timing signal (step S400)
2.7 First modification
2.8 Second modification
3. Second Embodiment
3.1 Configuration of imaging device
3.2 Third modification
4. Third Embodiment
5. Summary
6. Supplement 1. Background that has Caused Inventors to Create Embodiments of Present Disclosure First, before describing embodiments of the present disclosure, the background that has caused the inventors to create the embodiments of the present disclosure will be described.

In recent years, to provide secure and safe automobiles, the development of driving safety support systems that support drivers' driving and automatic driving has been promoted. In such development, it is required to recognize various objects such as traffic signs present around a vehicle with a vehicle-mounted imaging device or the like. For example, one of the objects to be recognized may be a self-luminous traffic sign 1 using LEDs as shown in FIG. 1, which is an explanatory diagram for explaining the background of the present disclosure. Such a self-luminous traffic sign 1 can display, for example, a number corresponding to a speed limit through the light emission of the LEDs, and thus allows drivers to easily visually recognize the speed limit even under poor visibility conditions such as at night.

However, the LEDs of the self-luminous traffic sign 1 have periodic flicker (a flicker phenomenon), though to an extent not perceived by humans, due to the frequency of an AC source that supplies power to the LEDs, the frequency of a power source controlled by a controller that adjusts the intensity of the LEDs, or the like. The period of the flicker phenomenon of the LEDs depends on the frequency of the AC source supplied or a frequency set by a contractor who installs traffic signs or a manager, with visibility taken into account. Therefore, in a large number of self-luminous traffic signs 1 installed on roads and the like nationwide, the periods of the flicker phenomenon of the LEDs are not uniform.

Further, when the self-luminous traffic sign 1 is imaged by the vehicle-mounted imaging device, the self-luminous traffic sign 1 may be imaged at the moment when the LEDs are turned off due to the flicker phenomenon, and thus the sign information (e.g., a speed limit) indicated by the self-luminous traffic sign 1 may not be able to be recognized from the captured image. For example, the LEDs of the self-luminous traffic sign 1 generally have a flicker frequency of 100 to 250 Hz. However, in order to establish secure and safe automobile driving, it is required to avoid a situation where the sign information of the self-luminous traffic sign 1 cannot be recognized due to the flicker phenomenon, in the vehicle-mounted imaging device.

Then, as a measure against this, it is conceivable to construct a system that notifies vehicles of traffic regulations and the like by radio signals. However, in this case, such a system will be constructed over the nationwide road network, and thus the cost of the system construction will be enormous. Thus, it is not a realistic measure.

Furthermore, Patent Document 1 described above discloses an example of an imaging device that captures an object (a traffic light) having a flicker phenomenon. The imaging device of Patent Document 1 measures the blinking period of the traffic light, compares the measured period with a threshold value to determine whether the traffic light is in an intended blinking state or is in a blinking state due to the flicker phenomenon, and selects a captured image to be stored on the basis of the determination result. That is, Patent Document 1 described above determines only the blinking state of the traffic light, and merely selects a representative image showing the state of the traffic light according to the blinking state, and is not a technique for acquiring an appropriate captured image that allows recognition of details of the object (e.g., details of information indicated by the object).

Furthermore, as a measure against the flicker phenomenon taken by the imaging device, a method is conceivable by which to increase the exposure time of the imaging device to an integral multiple of the period of the flicker phenomenon to capture the object when the object is being lit. However, in a case where such a measure is used in the vehicle-mounted imaging device, a captured image may be saturated (also called a "whiteout") due to the increased exposure time. Further, the vehicle on which the imaging device is mounted moves during the long exposure time, and thus a motion blur may occur on a captured image (also called a "subject blur"). On such a captured image, an image of the captured object is unclear, and thus it is difficult to recognize details of the object (e.g., details of information indicated by the object). That is, in such a case, it is difficult to recognize, for example, the sign information, and thus it is difficult to establish secure and safe automobile driving through recognition based on a captured image.

Therefore, in view of the above circumstances, the present inventors have come to create the embodiments of the present disclosure that can provide an appropriate captured image that allows recognition of an object even when a flicker phenomenon is occurring. For example, according to the embodiments of the present disclosure described below, even for the self-luminous traffic sign 1 having the flicker phenomenon, for example, a captured image that allows recognition of the sign information indicated by the self-light-emitting traffic sign 1 can be obtained. As a result, secure and safe automobile driving can be established by using the recognized sign information. Hereinafter, details of the embodiments of the present disclosure as described above will be sequentially described in detail.

In the following description, the embodiments of the present disclosure will be described using an example where they are applied to an imaging device for acquiring a captured image of an object that performs display through the light emission of LEDs or the like. However, the embodiments of the present disclosure are not limited to being applied to imaging devices as described above. For example, the embodiments of the present disclosure may be applied to an imaging device used for capturing images under a lighting device (illuminator) such as a fluorescent lamp (with a flicker frequency of 100 Hz or 120 Hz).

2. First Embodiment

<2.1 Configuration of Imaging Device>

Figure 2:
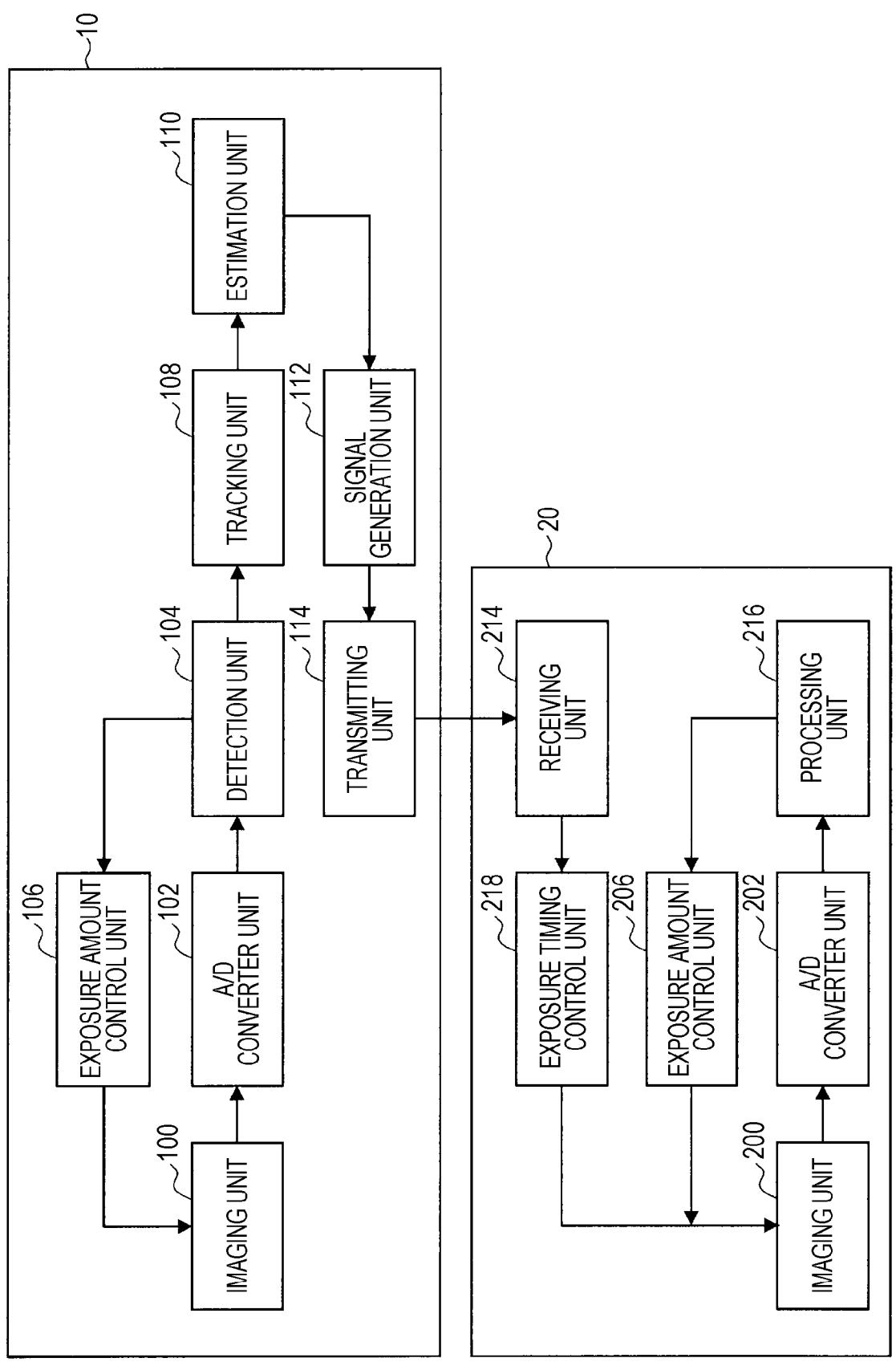
FIG. 2 is a block diagram of imaging devices 10 and 20 according to a first embodiment of the present disclosure.

In a first embodiment of the present disclosure described below, two or more imaging devices 10 and 20 are used to capture an object having a flicker phenomenon. First, the detailed configurations of the imaging devices 10 and 20 according to the present embodiment will be described with reference to FIG. 2. FIG. 2 is a block diagram of the imaging devices 10 and 20 according to the present embodiment.

(Imaging Device 10)

First, the imaging device 10 will be described with reference to FIG. 2. As shown in FIG. 2, the imaging device 10 according to the present embodiment mainly includes an imaging unit (first imaging unit) 100, an A/D converter unit 102, a detection unit 104, an exposure amount control unit 106, a tracking unit 108, an estimation unit 110, a signal generation unit 112, and a transmitting unit 114. Details of the functional units of the imaging device 10 will be described below.

—Imaging Unit 100—

The imaging unit 100 has a function of capturing an object. The imaging device 20 as described later is also provided with an imaging unit 200 similar to the imaging unit 100. However, the imaging unit 100 can perform capturing at an imaging frame rate (first frame rate) (e.g., 1000 fps) higher than the frame rate of the imaging unit 200 (second frame rate. More specifically, the imaging unit 100 can capture images at an imaging frame rate of about 100 to 10000 fps. Note that in the following description, the imaging frame rate means the number of imaging frames (still images) per unit time (one second), and is indicated in units of fps (frames per second). Furthermore, the imaging unit 100 mainly includes an optical system mechanism including an imaging lens, an aperture mechanism, a zoom lens, a focus lens, etc. (not shown), a solid-state image sensor array 300 (see FIG. 14) that photoelectrically converts captured image light obtained by the optical system mechanism to generate an imaging signal, and a drive system mechanism that controls the optical system mechanism (not shown).

Specifically, the optical system mechanism concentrates light incident from an object (subject) on the solid-state image sensor array 300 as an optical image, using the lenses. The solid-state image sensor array 300 is implemented, for example, by a charge-coupled device (CCD) sensor array, a complementary metal oxide semiconductor (CMOS) sensor array, or the like. The solid-state image sensor array 300 photoelectrically converts a formed optical image pixel by pixel, reads a signal of each pixel as an imaging signal, and outputs it to the A/D converter unit 102 as described later. Note that the pixel array in the solid-state image sensor array 300 is not particularly limited. For example, a Bayer array, a BW array (Mono array) entirely constituted of clear pixels, or the like can be selected. However, to improve the recognition of red light signals and vehicle tail lamps (red light) at night, it is preferable to select, as the pixel array, an RCCC array constituted of red pixels and clear pixels. Furthermore, the drive system mechanism includes a stepping motor or the like that drives the lenses etc.

—A/D Converter Unit 102—

The A/D converter unit 102 converts the imaging signal from the solid-state image sensor array 300 of the imaging unit 100 from an analog signal to a digital signal, and outputs it to the detection unit 104 as described later. The A/D converter unit 102 is implemented by an electronic circuit, for example.

—Detection Unit 104—

The detection unit 104 performs predetermined image processing on the digital signal output from the A/D converter unit 102, and detects the object on the basis of an acquired captured image. For example, the detection unit 104 mainly includes hardware such as a central processing unit (CPU), read-only memory (ROM), and random-access memory (RAM) provided in the imaging device 10. Note that details of the detection of the object in the detection unit 104 will be described later.

—Exposure Amount Control Unit 106—

The exposure amount control unit 106 detects the brightness of the entire captured image or the object in the captured image, and controls the imaging unit 100 described above so that the brightness of the captured image becomes appropriate, on the basis of the detection result. For example, the exposure amount control unit 106 can detect the brightness by detecting the amount of light received at the solid-state image sensor array 300 of the imaging unit 100. For example, as the brightness used for the control of the imaging unit 100, an integral value, a mean value, a maximum value, a minimum value, or the like of the brightness of the pixels of the entire captured image can be used. Furthermore, the exposure amount control unit 106 mainly includes hardware such as a CPU, ROM, and RAM provided in the imaging device 10.

—Tracking Unit 108—

The tracking unit 108 tracks the object detected by the detection unit 104 described above in a plurality of imaging frames (still images) that have been captured successively at a high speed by the imaging unit 100.

For example, the tracking unit 108 mainly includes hardware such as a CPU, ROM, and RAM provided in the imaging device 10. Note that details of the tracking of the object in the tracking unit 108 will be described later.

—Estimation Unit 110—

The estimation unit 110 estimates period information of the flicker phenomenon of the object, on the basis of the plurality of imaging frames of the tracked object. For example, the estimation unit 110 mainly includes hardware such as a CPU, ROM, and RAM provided in the imaging device 10. Note that details of the estimation in the estimation unit 110 will be described later.

—Signal Generation Unit 112—

On the basis of the estimation result of the estimation unit 110 described above, the signal generation unit 112 generates a timing signal for capturing the object in the imaging device 20 as described later. In other words, the signal generation unit 112 generates a synchronization signal for the imaging device 20. The timing signal is output to the imaging device 20, and serves as a reference for timing at which the imaging device 20 performs capturing of the object. For example, the signal generation unit 112 mainly includes hardware such as a CPU, ROM, and RAM provided in the imaging device 10. Note that details of the generation of the timing signal in the signal generation unit 112 will be described later.

—Transmitting Unit 114—

The transmitting unit 114 is a communication module for transmitting the timing signal etc. to the imaging device 20. For example, the transmitting unit 114 establishes synchronization with a receiving unit 214 of the imaging device 20 as described later by transmitting a pulse signal. Alternatively, the transmitting unit 114 may establish transmission and reception of the timing signal by time synchronization with the receiving unit 214 of the imaging device 20 as described later, using a technique such as Ethernet AVB (IEEE 802.1 Audio/Video Bridging). In this case, using the IEEE 802.1AS technique, which is one component of Ethernet AVB, time synchronization in the imaging devices 10 and 20 can be established accurately, and the timing signal can be output from the imaging device 10 to the imaging device 20 via a packet.

In addition to those described above, the imaging device 10 may include a positioning unit (not shown) that determines the position of the imaging device 10, or may use sensing date of the positioning unit provided separately from the imaging device 10. Specifically, the positioning unit is implemented, for example, by a global positioning system (GPS) positioning unit, and receives radio waves from GPS satellites to detect the position where the imaging device 10 is located. Alternatively, other than the GPS, the positioning unit may be a device that detects the position through, for example, wireless fidelity (Wi-Fi, registered trademark), Bluetooth (registered trademark), transmission and reception to and from mobile phones, personal handy-phone system (PHS), smartphones, etc., short-range communication, or the like.

In addition to the above-described functional units, the imaging device 10 may further include a storage unit (not shown) that stores captured images captured by the imaging device 10, and programs and parameters for the imaging device 10 to execute the functions. The storage unit 122 includes, for example, RAM or the like. In addition to the above-described functional units, the imaging device 10 may further include an operation display unit (not shown) that displays a captured image captured by the imaging device 10 for a user, and further accepts input operations of the user. In this case, the display function of the operation display unit is implemented, for example, by a liquid crystal display (LCD) device or an organic light-emitting diode (OLED) device. Furthermore, the operation acceptance function of the operation display unit is implemented, for example, by a touch panel.

(Imaging Device 20)

Next, the imaging device 20 will be described with reference to FIG. 2. As shown in FIG. 2, the imaging device 20 according to the present embodiment mainly includes the imaging unit (second imaging unit) 200, an A/D converter unit 202, an exposure amount control unit 206, the receiving unit 214, a processing unit 216, and an exposure timing control unit 218. Details of the functional units of the imaging device 20 will be described below. Note that in the imaging device 20, the imaging unit 200, the A/D converter unit 202, and the exposure amount control unit 206 are the same as the imaging unit 100, the A/D converter unit 102, and the exposure amount control unit 106 of the imaging device 10, and thus will not be described here.

—Receiving Unit 214—

The receiving unit 214 is a communication module for receiving the timing signal etc. from the imaging device 10. As described above, the receiving unit 214 establishes synchronization with the transmitting unit 114 by transmitting a pulse signal, for example. Alternatively, the receiving unit 214 may establish transmission and reception of the timing signal through time synchronization with the transmitting unit 114, using a technique such as Ethernet AVB (IEEE 802.1 Audio/Video Bridging).

—Processing Unit 216—

The processing unit 216 performs various types of signal processing such as white balance adjustment, color correction, edge enhancement, and gamma correction on imaging signals from the A/D converter unit 202 to acquire a captured image. For example, an image of the self-luminous traffic sign 1 is extracted from the captured image acquired by the processing unit 216. By analyzing the extracted image, the sign information of the self-luminous traffic sign 1 can be recognized. Furthermore, the processing unit 216 mainly includes hardware such as a CPU, ROM, and RAM provided in the imaging device 20.

—Exposure Timing Control Unit 218—

The exposure timing control unit 218 controls the imaging timing of the imaging unit 200, on the basis of the timing signal from the imaging device 10. For example, the exposure timing control unit 218 detects a difference between the current exposure start timing to acquire an imaging frame and the timing signal, and controls the imaging unit 200 on the basis of the detection result so that the start timing coincides with the timing signal. Furthermore, the exposure timing control unit 218 mainly includes hardware such as a CPU, ROM, and RAM provided in the imaging device 20.

Note that in the present embodiment, the solid-state image sensor arrays 300 included in the imaging unit 100 and the imaging unit 200 may be identical to each other in the angle of view and pixel array, or may be different. For example, the solid-state image sensor arrays 300 included in the imaging unit 100 and the imaging unit 200 can each be a Bayer array or a BW array.

Similar to the imaging device 10, the imaging device 20 may further include a storage unit (not shown) that stores captured images captured by the imaging device 10, and programs and parameters for the imaging device 10 to execute the functions, in addition to those described above.

<2.2 Outline of Imaging Method>

Figure 3:
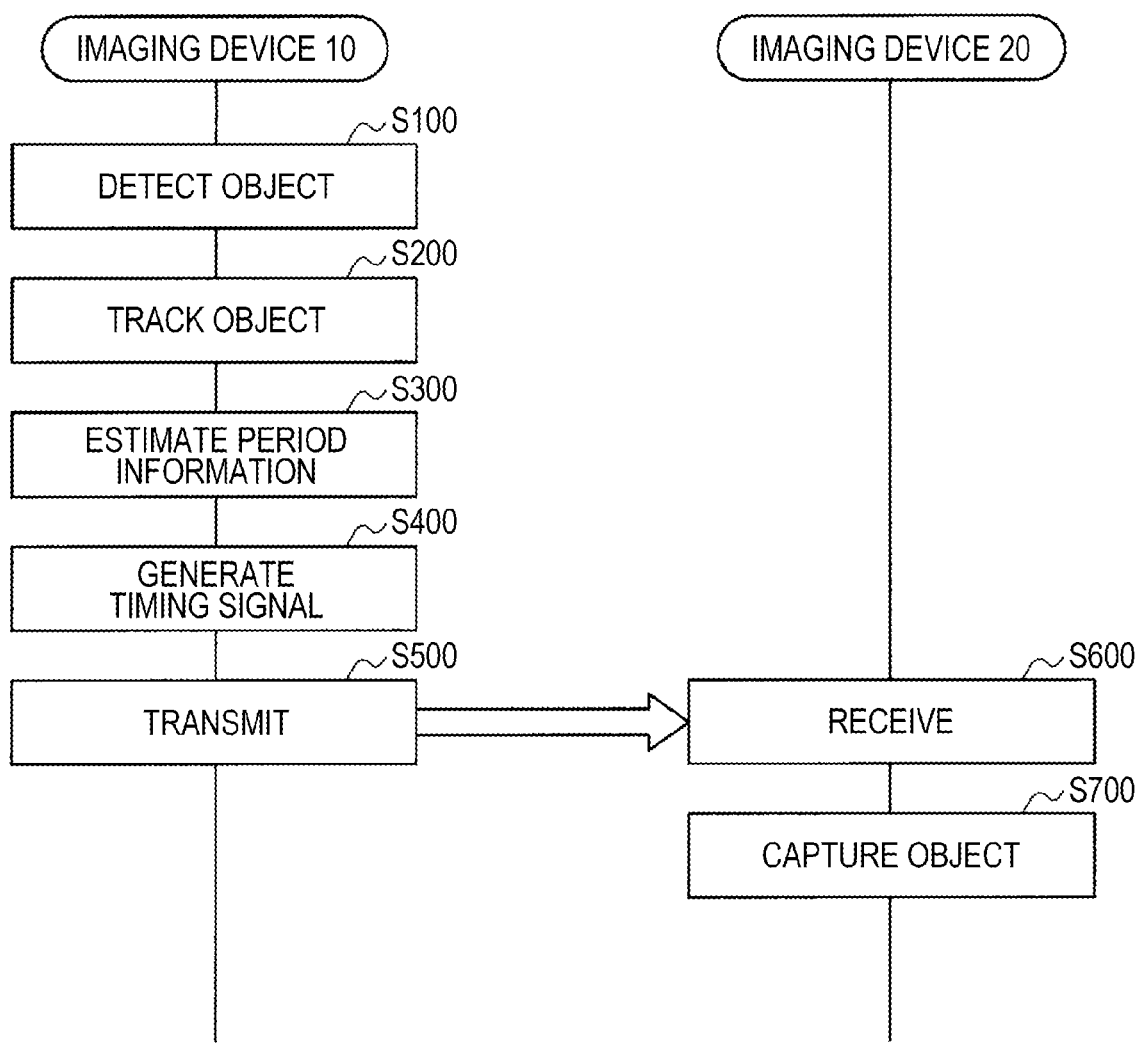
FIG. 3 is a sequence diagram of an imaging method according to the embodiment.

The configurations of the imaging devices 10 and 20 according to the present embodiment have been described in detail above. Next, an outline of an imaging method according to the present embodiment will be described with reference to FIG. 3. FIG. 3 is a sequence diagram of the imaging method according to the present embodiment. As shown in FIG. 3, the imaging method according to the present embodiment includes a plurality of steps from step S100 to step S700. Outlines of the steps included in the imaging method according to the present embodiment will be described below. Note that only the outline of the imaging method according to the present embodiment will be described here, and details of the steps will be described later.

(Step S100)

The imaging device 10 continuously captures an object (e.g., the self-luminous traffic sign 1 or the like) at a high frame rate (e.g., 1000 fps), and detects the object from a plurality of acquired imaging frames. Note that the frame rate of the imaging device 10 (high frame rate) (first frame rate) is preferably equal to or higher than a value obtained by multiplying the period of a flicker light source by a numerical value that is twice the inverse of the duty ratio. With this, the object can be caught precisely in each imaging frame. For example, in a case where the pulse width is 1 ms and the pulse period is 4 ms in a flicker phenomenon, the duty ratio of the flicker phenomenon is 0.25. Thus, in this case, the high frame rate is preferably set to 2000 fps that is obtained by multiplying four, which is the inverse of the duty ratio of 0.25, by two, and further multiplying the result by a flicker frequency of 250 Hz, or higher. Furthermore, details of the detection of the object will be described later.

(Step S200)

The imaging device 10 performs tracking on the detected object in a plurality of imaging frames acquired successively at the high frame rate. Note that details of the tracking of the object will be described later.

(Step S300)

The imaging device 10 estimates period information (the frequency, lighting time, lighting interval, etc.) of the flicker phenomenon of the object, on the basis of the imaging frames of the object being tracked. Specifically, the imaging device 10 estimates the period information on the basis of changes in the brightness of the object on the plurality of imaging frames. Note that details of the estimation of the period information will be described later.

(Step S400)

The imaging device 10 generates a timing signal that determines the timing to capture the object, on the basis of the estimated period information.

(Step S500)

The imaging device 10 transmits the timing signal to the imaging device 20.

(Step S600)

The imaging device 20 receives the timing signal from the imaging device 10.

(Step S600)

The imaging device 20 controls imaging timing at the imaging unit 200, on the basis of the received timing signal. Moreover, the imaging device 20 can obtain a captured image of the object by processing imaging signals obtained by the imaging unit 200. At this time, the imaging device 20 performs capturing at a low frame rate (second frame rate) (e.g., 30 fps or 60 fps) lower than that of the imaging device 10.

As described above, in the present embodiment, by tracking an object, changes in the brightness of the object in a plurality of imaging frames are detected, and from the detected changes in the brightness, period information of the flicker phenomenon (blinking) of the object is estimated. According to the present embodiment, since the object is tracked, changes in the brightness of the object can be captured with high accuracy, and further, the period information can be estimated with high accuracy. Then, in the present embodiment, a timing signal for appropriately capturing the object is generated, on the basis of the estimated period information. As a result, according to the present embodiment, the imaging device 20 captures the object on the basis of the timing signal, and thus can acquire an optimal captured image that can further ensure the recognition of the object. Moreover, in the present embodiment, since the period information is estimated quickly using imaging frames obtained at the high frame rate to generate the timing signal, the imaging device 20 can capture the object in real time. Next, details of the steps in the imaging method as described above will be described.

<2.3 Detection of Object (Step S100)>

Figure 4:
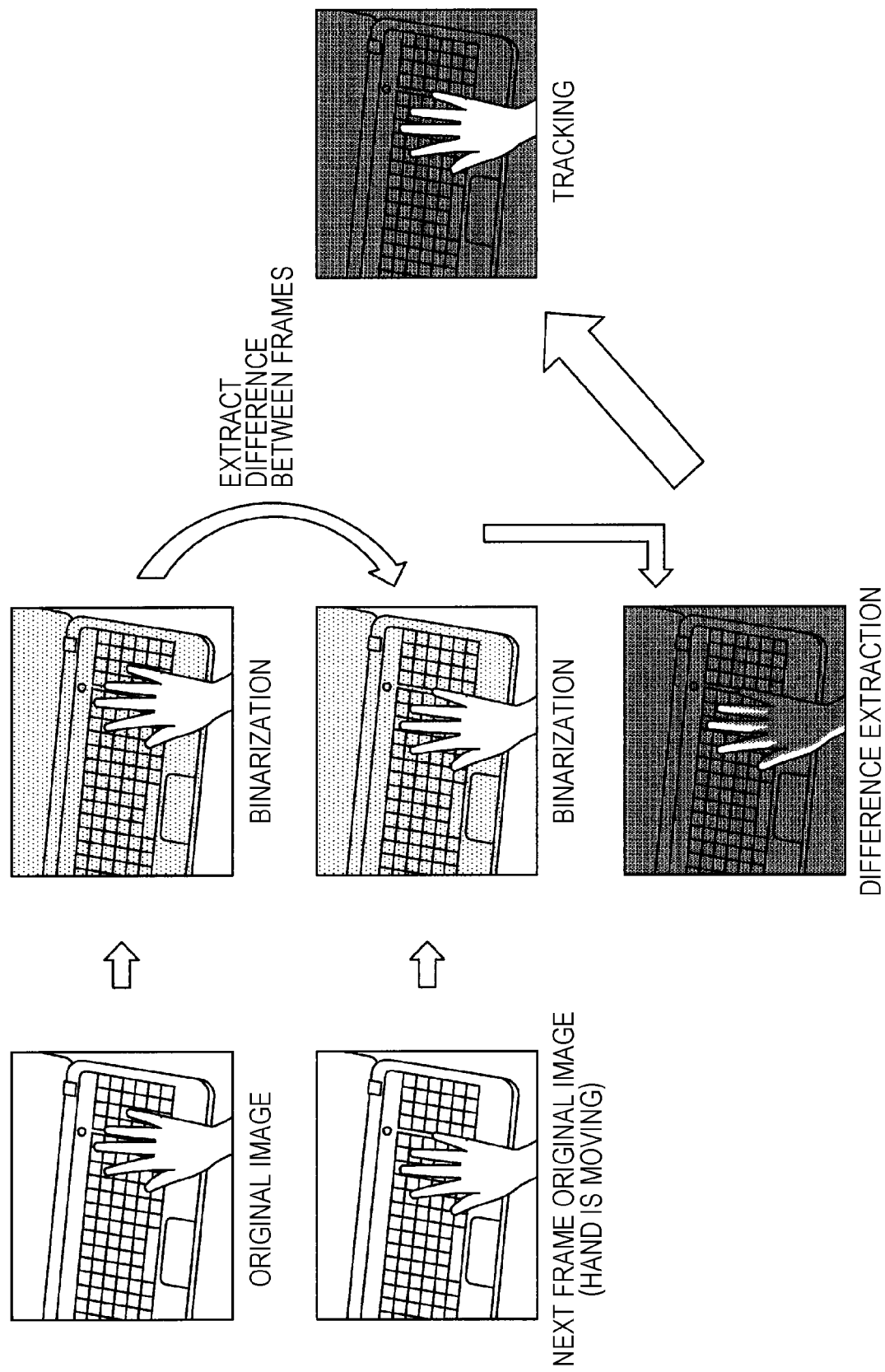
FIG. 4 is an explanatory diagram for explaining detection of an object according to the embodiment.

First, an example of the detection of the object in step S100 described above will be described with reference to FIG. 4. FIG. 4 is an explanatory diagram for explaining the detection of an object according to the present embodiment. The example shown in FIG. 4 shows a method of detecting an object to be tracked from a plurality of imaging frames captured at a high frame rate. In FIG. 4, for the sake of clarity, it is assumed that the object is not the self-luminous traffic sign 1 but a human hand. In addition, it is assumed that the hand is moving slightly in a narrow area for typing on a keyboard. Note that in the present embodiment, the object is not limited to such a human hand, and may be, for example, the self-luminous traffic sign 1 that appears to be moving from a vehicle window, and is not particularly limited.

First, captured color imaging frames as shown on the left side of FIG. 4 are subjected to processing under predetermined conditions, to generate gray-scaled imaging frames. Specifically, in the present embodiment, in a case where an imaging frame gray-scaled in red (R), for example, is generated, the red (R) pixel value (color information) of each pixel in a color imaging frame is extracted. In this case, for example, in the gray-scaled imaging frame, a pixel with a high R pixel value becomes white, and a pixel with a low R pixel value becomes black. Then, in the present embodiment, the R pixel value of each pixel of the gray-scaled imaging frame is compared with a predetermined threshold value. For example, the pixel value of a pixel equal to or higher than the predetermined threshold value is converted to one, and the pixel value of a pixel less than the predetermined threshold value is converted to zero. This can generate a binarized imaging frame as shown in the center of FIG. 4.

Note that when a gray-scaled imaging frame is generated, the element value of one of red, green, and blue (RGB) may be extracted, or a mean value of the three element values may be used, or a value obtained by integrating the element values after the element values are weighted may be used. Furthermore, when a gray-scaled imaging frame is generated, it is preferable to select a suitable color and method according to the characteristics of an object to be detected (red for a traffic sign).

Furthermore, in a case where a person is to be detected as an object, the person can be detected on the basis of the person's skin color. Specifically, by extracting only pixels whose element values of the three colors satisfy the following relational expression (1), pixels corresponding to human skin color are extracted. Then, a person can be detected on the basis of the skin color extraction result.

[Equation 1]

$$R > G*(1+\alpha)$$

$$R > B*(1+\beta)$$

$$\gamma MAX > R > \gamma MIN \tag{1}$$

Note that in relational expression (1) above, R, G, and B represent the element values of the colors. Furthermore, γMAX and γMIN represent the maximum value and the minimum value of the element value of each color. Moreover, in relational expression (1) above, α, β, γMAX, and γMIN are coefficients that the user can set as desired.

Alternatively, the detection of skin color may be performed, for example, by processing the three element values of each pixel in a color imaging frame using a predetermined mathematical formula, calculating an index value on each pixel, and extracting only pixels whose calculated index values are within a predetermined range. For example, the three element values of each pixel may be converted to an index value based on an HSV model expressed by hue, saturation, and brightness.

Moreover, in the present embodiment, a plurality of binarized imaging frames shown in the upper and middle rows of the central column of FIG. 4 are compared, and a difference between the imaging frames is extracted, so that a specific area (target) caused by motion is extracted as shown in the lower row of the central column of FIG. 4.

Note that in the present embodiment, the detection of the object is not limited to the above-described method. For example, characteristic points of the object may be stored in advance, and detection of the object may be performed by extracting the stored characteristic points from an imaging frame. For example, in this case, in a case where the object is a person's face, the person is detected on the basis of characteristic points (the eyes, nose, and mouth) of the person's face.

Furthermore, in a case where the imaging device 10 is provided with the positioning unit (not shown) that detects the position of the imaging device 10, the object may be detected on the basis of sensing data of the positioning unit. Specifically, in a case where the imaging device 10 is mounted on a vehicle, and the object is a traffic light, it is clear that a captured image of the traffic light will appear in an area fixed to the imaging device 10 (vehicle) (e.g., a left front area of the vehicle). That is, the traffic light will be present in an area fixed with respect to the angle of view of the imaging device 10. Therefore, by referring to map information including position information of the traffic light stored in advance and the sensing data of the positioning unit, the imaging device 10 can recognize the position where the traffic light will appear in advance, and thus can detect the traffic light on the basis of the recognition result.

Furthermore, in the present embodiment, the detection of the object is not limited to the above-described method. For example, the detection of the object may be performed by displaying an imaging frame captured first to the user, and the user selecting a desired object in the imaging frame.

<2.4 Tracking of Object (Step S200)>

Next, the tracking of the object in step S200 described above will be described. In step S200, as shown on the right side of FIG. 4, tracking is performed on the object (the hand in FIG. 4) detected in step S100 described above.

For example, in the present embodiment, self windowing is used to keep track of the object in a plurality of successive imaging frames captured at the high frame rate.

Specifically, self windowing is a type of algorithm for tracking an object in imaging frames captured at a high frame rate. In a case where images are captured at a high frame rate, the moving distance (difference) of the object in a plurality of imaging frames is small. Therefore, in a case where an extraction window for extracting the object has been set in an area around the object in the previous imaging frame, the object will be included in the extraction window also in the next imaging frame. More specifically, the extraction window is set as a pixel area that is expanded outward by one pixel with respect to a pixel area showing the object in the previous imaging frame. If the object is not included in the set extraction window in the next imaging frame rate, by setting the frame rate higher, the object can be included in the extraction window. Further, since the moving distance of the object is small, the area of the extraction window, which is a range searched for the object, can be narrowed. Thus, by performing image matching or the like in the extraction window, the object can be easily detected. Note that although the extraction window has been described as being set as the pixel area expanded outward by one pixel with respect to the pixel area showing the object in the previous imaging frame in the above description, the present embodiment is not limited to the expansion by one pixel. For example, in the present embodiment, a pixel area expanded by two or more pixels may be set as the extraction window. The number of pixels by which the pixel area is expanded can be suitably selected according to the frame rate and the speed of the object, or the like, for example. Furthermore, although it has been described that in a case where the object is not included in the set extraction window in the next imaging frame rate, the frame rate is set higher in the above description, the present embodiment is not limited to such a method. For example, the number of pixels by which the pixel area is expanded may be adjusted when an extraction window is set so that the object is included in the extraction window.

Moreover, self windowing calculates a logical product between the extraction window calculated from the previous imaging frame and the next binarized object image, thereby generating a target extraction image and tracking the object. Furthermore, according to self windowing, images of the object are compared between target extraction images of two successive imaging frames, so that not only the position information and area (shape) information of the object but also information such as the moving direction and moving speed of the object can be acquired. As is clear from the above description, in a case where self windowing is used, it is preferable that imaging frames used for tracking an object are captured at a high frame rate.

Note that in the present embodiment, tracking of an object is not limited to the above-described example, and another method may be used. For example, in the present embodiment, tracking of an object may be performed on the basis of characteristic points that two successive imaging frames have in common.

<2.5 Estimation of Period Information (Step S300)>

Next, the estimation of the period information in step S300 described above will be described. For example, in the present embodiment, the mean value of the brightness of an image of the tracked object is stored for each of a plurality of imaging frames, and by using the discrete Fourier transform (DFT) on the stored data, period information of the flicker phenomenon such as the frequency, the width of the lighting time, and the lighting interval is estimated.

Specifically, in a case where the object is being blinked by LEDs having a flicker phenomenon, or in a case where the object is illuminated by blinking LEDs, the brightness of the object in a plurality of imaging frames should change according to the period of the flicker phenomenon. Therefore, in the present embodiment, the mean value of the brightness of a plurality of pixels corresponding to an image of the object is acquired for each of a plurality of imaging frames acquired at a predetermined frame rate, and by applying the DFT, changes over time in brightness, that is, a frequency component (frequency, lighting time width, lighting interval, etc.) in changes over time in brightness is estimated. Note that since the imaging frames used for estimating the period information are acquired at a frame rate higher than the period of the flicker phenomenon, the period information of the flicker phenomenon can be estimated by applying the DFT.

Note that in the present embodiment, the estimation of the period information is not limited to the above-described example, and another method may be used. For example, in the present embodiment, the period information may be estimated by analyzing a plurality of imaging frames in a predetermined period, and counting the number of imaging frames in which the light of the object is turned on and the number of imaging frames in which the light of the object is turned off.

<2.6 Generation of Timing Signal (Step S400)>

Next, the generation of the timing signal in step S400 described above will be described with reference to FIGS. 5 to 8. FIGS. 5 to 8 are explanatory diagrams for explaining examples of the timing signal according to the present embodiment. Note that in FIGS. 5 to 8, imaging timing at the imaging device 10 is indicated by vertical lines in the upper row. Further, in the middle row, the timing signal transmitted from the imaging device 10 to the imaging device 20 is indicated by vertical lines, and the exposure time at the imaging device 20 is indicated by bands extending in the horizontal direction. In addition, in the lower row, the lighting time of the LEDs as the object is indicated by bands extending in the horizontal direction.

In the present embodiment, the signal generation unit 112 generates a signal to control the timing of exposure start at the imaging device 20 or a timing signal to control the timing of exposure end, on the basis of the period information estimated in step S300 described above. Regardless of which signal is generated, the generated timing signal satisfies the following conditions. Specifically, in the present embodiment, the frequency of the timing signal is set such that the imaging frame rate of the imaging device 10 (high frame rate) is an integral multiple of the imaging frame rate of the imaging device 20 (low frame rate). Moreover, the frequency of the timing signal is set such that the frequency of the flicker phenomenon (the frequency of blinking of the LEDs) is an integral multiple of the imaging frame rate of the imaging device 20.

Figure 5:
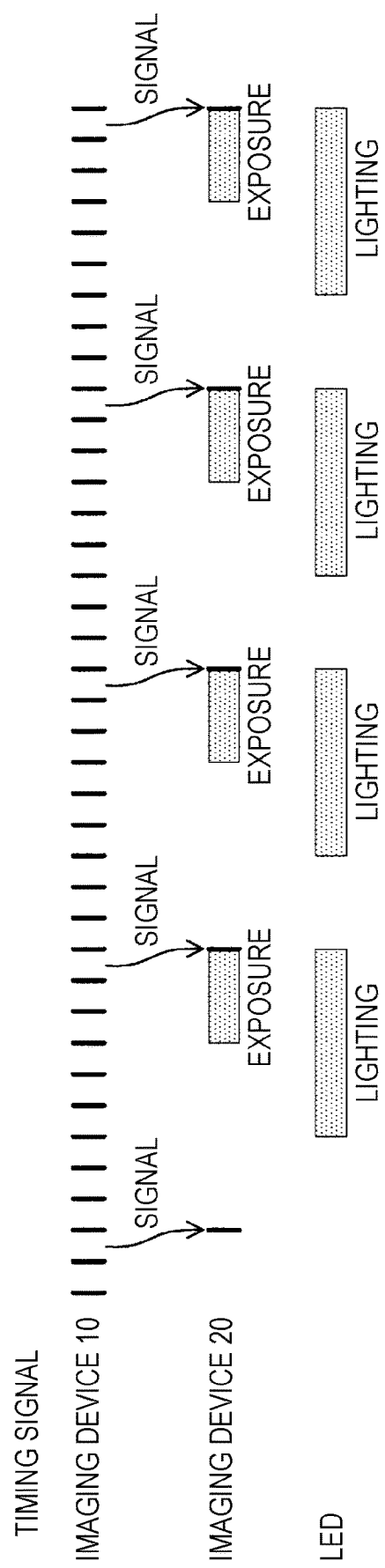
FIG. 5 is an explanatory diagram (the first one) for explaining an example of a timing signal according to the embodiment.

Specifically, FIG. 5 shows a case where the timing signal to control the timing of exposure end at the imaging device 20 is generated, and further, a case where the frequency of the flicker phenomenon (the frequency of blinking of the LEDs) is equal to the frame rate of the imaging device 20. That is, in the example shown in FIG. 5, the imaging device 20 is controlled to end exposure upon receiving the timing signal. In the example of FIG. 5, for example, in a case where the imaging frame rate of the imaging device 10 is 1200 fps, the imaging frame rate of the imaging device 20 is 120 fps, and the frequency of blinking of the LEDs is 120 Hz.

Figure 6:
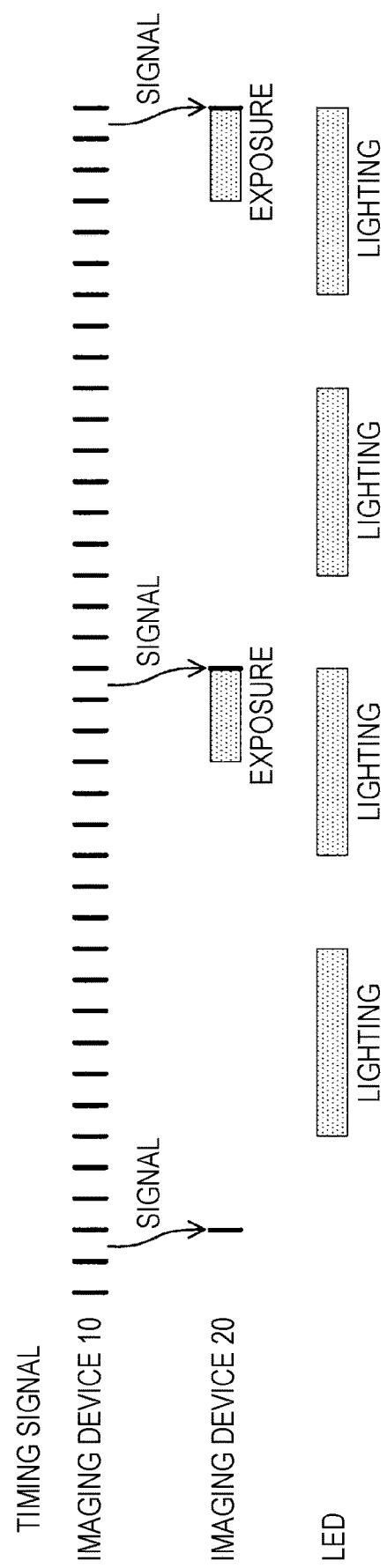
FIG. 6 is an explanatory diagram (the second one) for explaining an example of a timing signal according to the embodiment.

FIG. 6 shows a case where the timing signal to control the timing of exposure end at the imaging device 20 is generated, and further, a case where the frequency of the flicker phenomenon (the frequency of blinking of the LEDs) is twice the imaging frame rate of the imaging device 20. In the example of FIG. 6, for example, in a case where the imaging frame rate of the imaging device 10 is 1200 fps, the imaging frame rate of the imaging device 20 is 60 fps, and the frequency of blinking of the LEDs is 120 Hz.

Figure 7:
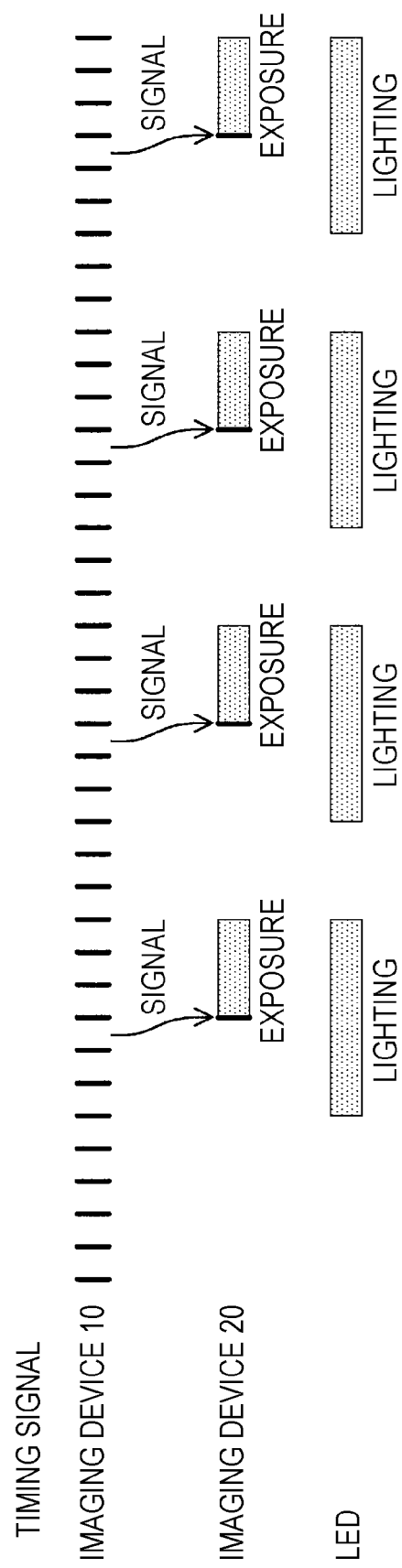
FIG. 7 is an explanatory diagram (the third one) for explaining an example of a timing signal according to the embodiment.

FIG. 7 shows a case where the timing signal to control the timing of exposure start at the imaging device 20 is generated, and further, a case where the frequency of the flicker phenomenon (the frequency of blinking of the LEDs) is equal to the frame rate of the imaging device 20. That is, in the example shown in FIG. 7, the imaging device 20 is controlled to start exposure upon receiving the timing signal. In the example of FIG. 7, for example, in a case where the imaging frame rate of the imaging device 10 is 1200 fps, the imaging frame rate of the imaging device 20 is 120 fps, and the frequency of blinking of the LEDs is 120 Hz.

Figure 8:
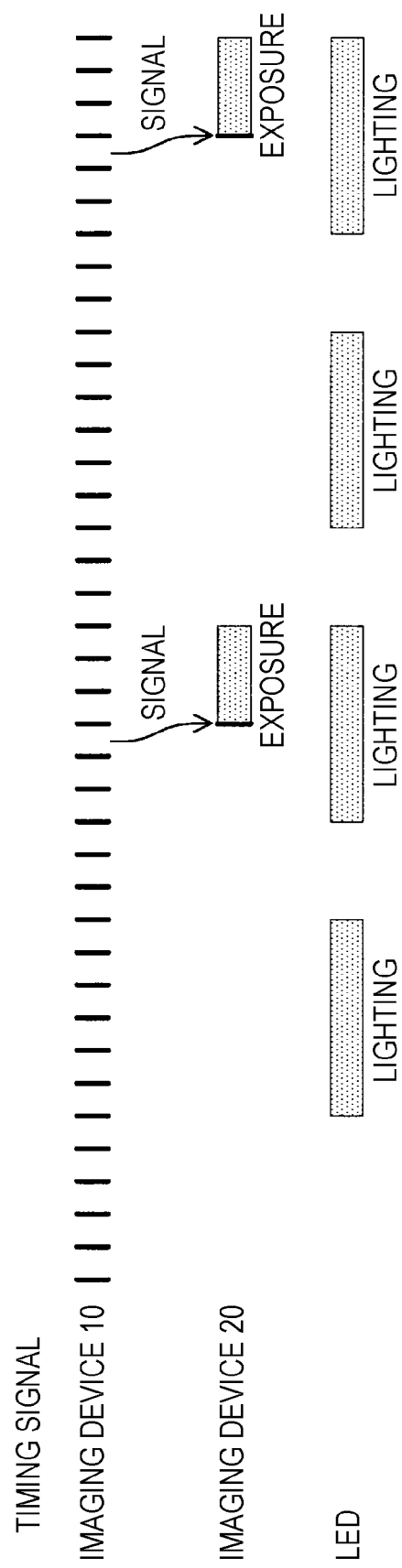
FIG. 8 is an explanatory diagram (the fourth one) for explaining an example of a timing signal according to the embodiment.

FIG. 8 shows a case where the timing signal to control the timing of exposure start at the imaging device 20 is generated, and further, a case where the frequency of the flicker phenomenon (the frequency of blinking of the LEDs) is twice the imaging frame rate of the imaging device 20. In the example of FIG. 8, for example, in a case where the imaging frame rate of the imaging device 10 is 1200 fps, the imaging frame rate of the imaging device 20 is 60 fps, and the frequency of blinking of the LEDs is 120 Hz.

Note that in a case where it is desired that the imaging device 20 captures the object in each imaging frame, it is preferable that the frequency of the timing signal is set to a value obtained by multiplying the period of the flicker light source by the inverse of the duty ratio, or higher. Furthermore, in the present embodiment, the timing signal generated is not limited to the signal shown in FIGS. 5 to 8. For example, the timing signal is not particularly limited as long as it is a signal that can control the imaging device 20 so that the exposure period of the imaging device 20 can be made coincident with at least part of the LED lighting period.

Note that the period of the flicker phenomenon (the frequency of blinking of the LEDs) and the imaging frame rate of the imaging device 20 may not be in an integer multiple relationship due to minute errors. In that case, the period shifts as time passes, and the imaging device 20 may not be able to capture the object being lit. Therefore, in the present embodiment, by estimating the period information of the flicker phenomenon once every few times, preferably every time, and generating the timing signal on the basis of the estimation result, a period shift as described above can be avoided.

Furthermore, the imaging unit 200 of the imaging device 20 preferably uses global shutter, that is, simultaneous exposure all-at-once readout, but may use rolling shutter, that is, line exposure sequential readout. Specifically, global shutter refers to control in which the pixels 302 (see FIG. 14) of the solid-state image sensor array 300 of the imaging unit 200 are exposed simultaneously and read simultaneously. In addition, rolling shutter refers to control in which the pixels 302 of the solid-state image sensor array 300 of the imaging unit 200 are sequentially exposed and read line by line. In the present embodiment, in a case where the imaging unit 200 of the imaging device 20 uses rolling shutter, by generating a timing signal that takes into account a shift in exposure time/readout time of each line, the lit object being lit can be imaged. Alternatively, in the above-described case, by controlling the imaging unit 200 with the above-described shift taken into consideration, the object being lit can be imaged.

As described above, in the present embodiment, by tracking the object, changes in the brightness of the object in a plurality of imaging frames are detected, and from the detected changes in the brightness, the period information of the flicker phenomenon (blinking) of the object is estimated. According to the present embodiment, since the object is tracked, changes in the brightness of the object can be captured with high accuracy, and further, the period information can be estimated with high accuracy. Further, in the present embodiment, by generating the timing signal for capturing the object appropriately on the basis of the estimated period information, an optimal captured image that can further ensure the recognition of the object can be acquired. Moreover, in the present embodiment, since the period information is estimated quickly using imaging frames obtained at the high frame rate to generate the timing signal, the imaging device 20 can capture the object in real time. Specifically, for example, in a case where the imaging devices 10 and 20 according to the present embodiment are mounted on a vehicle, and capture the self-luminous traffic sign 1, the imaging device 20 can capture the self-luminous traffic sign 1 in a lit state, and thus can ensure that the sign information (speed limit) of the self-luminous traffic sign 1 is recognized. As a result, according to the present embodiment, a driving safety support system that supports a driver's driving, and further automatic driving, using captured images can be constructed.

Note that the present embodiment is not limited to capturing the above-described self-luminous traffic sign 1 with the imaging device 20 mounted on the vehicle, and can capture buildings and illuminations having a blinking lighting device or the like, present around the vehicle traveling. Furthermore, as will be described later, the present embodiment can also be used for capturing a plurality of objects having different blinking periods. In this case, a plurality of objects in a blinking state can be imaged simultaneously, or can be imaged with some objects excluded.

Figure 9:
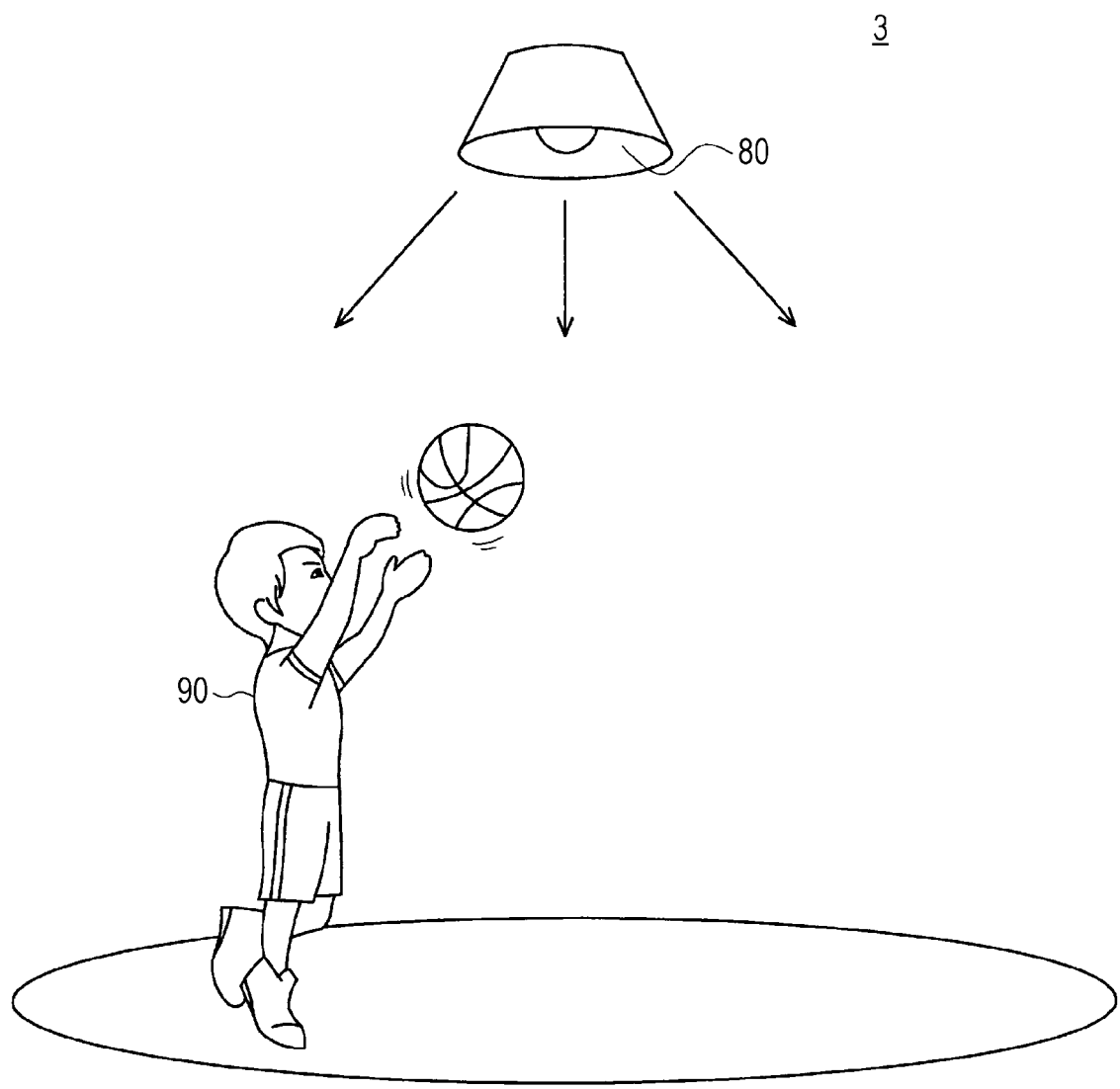
FIG. 9 is an explanatory diagram for explaining an example of an imaging scene in the embodiment.

Moreover, the present embodiment can also be applied to capturing under a fluorescent light. For example, as shown in FIG. 9, which is an explanatory diagram for explaining an example of an imaging scene in the present embodiment, the present embodiment can also be applied to an imaging device that captures an athlete 90 under a lighting device 80 that is blinking due to a flicker phenomenon, indoors, such as in a gymnasium 3. Specifically, according to the present embodiment, even in a case where the athlete 90 lit up by the lighting device 80 having the flicker phenomenon such as a fluorescent light is playing a sport such as basketball in which he or she moves quickly, the motion of the athlete 90 can be imaged.

<2.7 First Modification>

Figure 10:
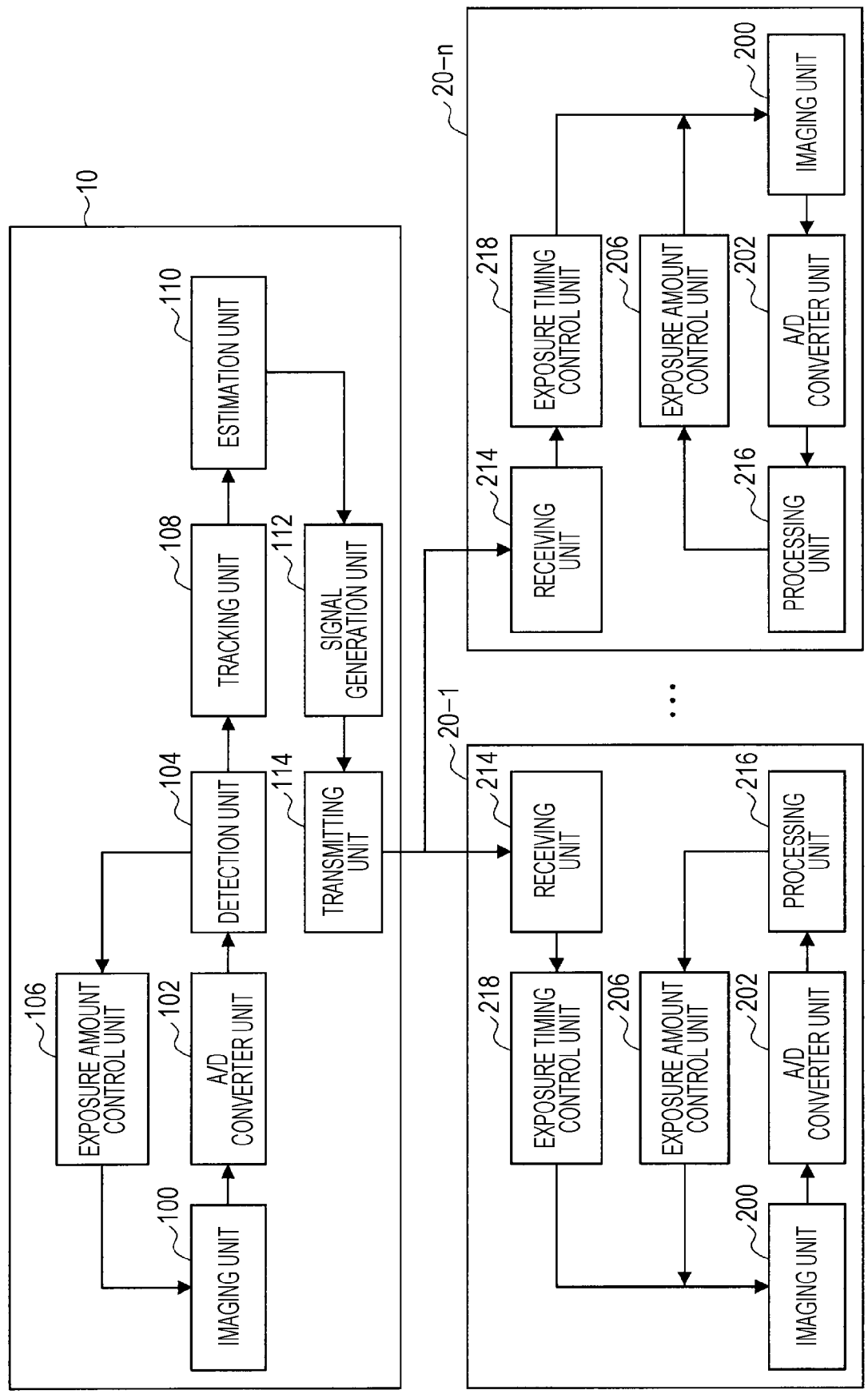
FIG. 10 is a block diagram of the imaging devices 10 and 20 according to a first modification of the embodiment.
Figure 11:
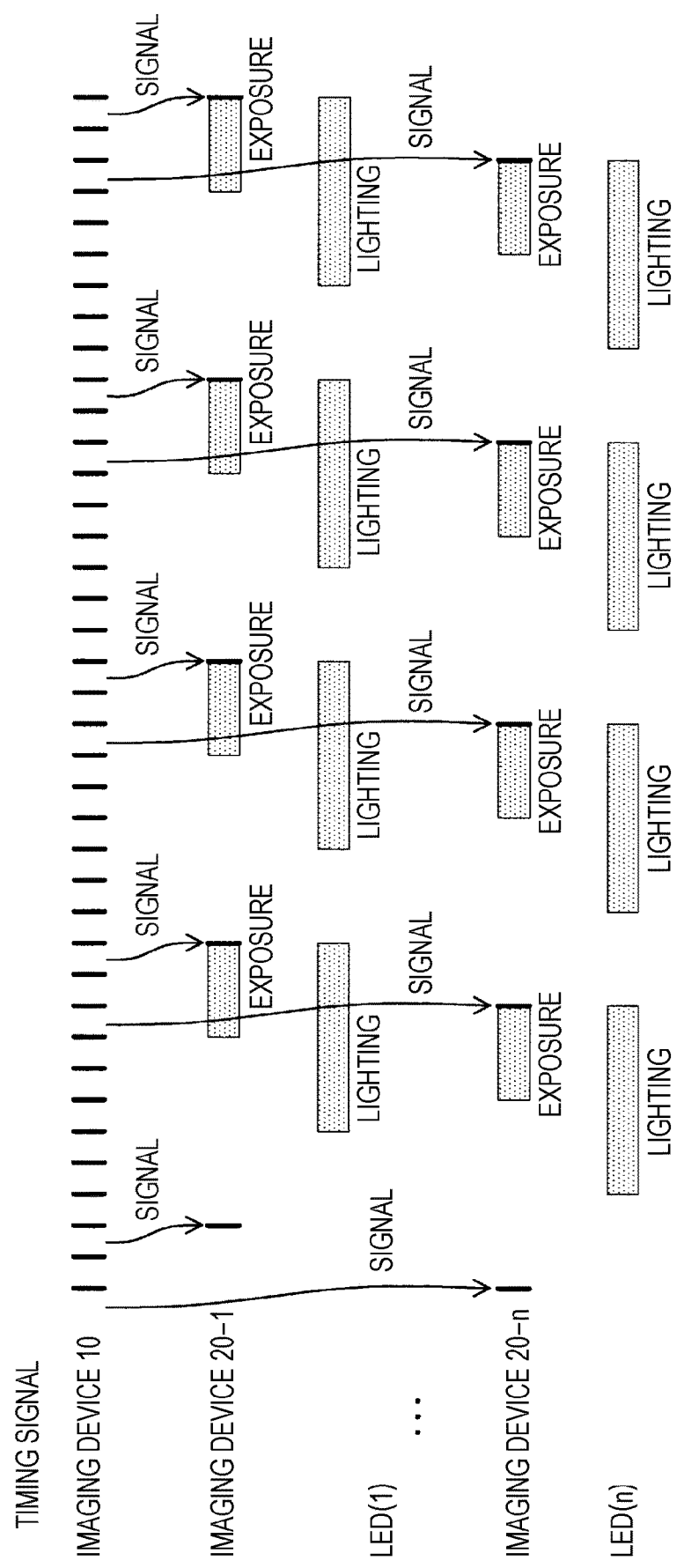
FIG. 11 is an explanatory diagram for explaining an example of timing signals according to the first modification of the embodiment.

In the first embodiment described above, it is aimed to capture one object. However, in the present embodiment, as described above, it may be aimed to capture a plurality of objects. The details of the present modification will be described below with reference to FIGS. 10 and 11. FIG. 10 is a block diagram of the imaging devices 10 and 20 according to the first modification of the present embodiment. FIG. 11 is an explanatory diagram for explaining an example of timing signals according to the first modification of the present embodiment. Note that in FIG. 11, imaging timing at the imaging device 10 is indicated by vertical lines in the upper row. Furthermore, in the second and fourth rows from the top, timing signals transmitted from the imaging device 10 to an imaging device 20-1 and an imaging device 20-n are indicated by vertical lines, and exposure times at the imaging devices 20-1 and 20-n are indicated by bands extending in the horizontal direction. Further, in the third and fifth rows from the top, the lighting time of LEDs (1) that are an object of the imaging device 20-1 and the lighting time of LEDs (n) that are an object of the imaging device 20-n are indicated by bands extending in the horizontal direction.

As shown in FIG. 10, in the present modification, a plurality (n) of the imaging devices 20 described above is provided. Furthermore, in the present modification, the imaging device 10 including the detection unit 104, the tracking unit 108, and the estimation unit 110 detects and tracks a plurality of objects, and estimates period information of the flicker phenomenon of each object. Moreover, the signal generation unit 112 of the imaging device 10 generates a plurality of timing signals for capturing the objects, on the basis of the estimated period information. Then, the plurality of timing signals generated by the imaging device 10 is transmitted to the plurality of corresponding imaging devices 20, and the imaging devices 20 capture the corresponding objects. Therefore, for example, in a case where the period information pieces of the flicker phenomenon of the objects are different from each other, the imaging device 10 generates a plurality of timing signals having different periods.

Specifically, as illustrated in FIG. 11, the imaging device 10 transmits timing signals having different periods to the imaging device 20-1 and the imaging device 20-n. In the example of FIG. 11, the imaging device 10 generates timing signals to control the timings of exposure end at the imaging devices 20-1 and 20-n. As can be seen from FIG. 11, even if the periods of blinking of the LEDs (1) and the LEDs (n) to be imaged are different from each other, the imaging devices 20-1 and 20-n perform exposure in accordance with the blinking periods, so that the LEDs (1) and the LEDs (n) in a lit state can be imaged. In the example of FIG. 11, in a case where the imaging frame rate of the imaging device 10 is 1200 fps, for example, although the imaging frame rates of the imaging device 20-1 and the imaging device 20-n are 100 fps, the imaging devices 20-1 and 20-n perform exposure at different timings. Furthermore, although the LEDs (1) and the LEDs (n) have a blinking frequency of 100 Hz, for example, they are lit at different timings in this example.

Furthermore, since the period information of the objects can be estimated in the present modification, in a case where the lighting timings of the objects are different from each other, for example, the imaging devices 20 can be controlled to capture only a specific object, on the basis of the estimated period information. Here, specifically, a case where one of two installed illuminations is to be imaged by the imaging devices 20 is considered. Note that in this case, it is assumed that these illuminations do not blink in synchronization with each other. In a case where such capturing is performed, the imaging device 10 estimates the period information of blinking of the two illuminations, calculates a period for capturing only one illumination, and controls the imaging devices 20 on the basis of the calculation result.

Furthermore, in the present modification, in a case where two imaging devices 20 are used, on the basis of parallax information of them, distance measurement can be performed on the same object. In this case, the two imaging devices 20 are required to capture the same object at the same time. Thus, the imaging device 10 transmits timing signals to simultaneously expose the two imaging devices 20 to them. Furthermore, in such a case, for example, the control timing of a millimeter-wave radar 50 (see FIG. 16) provided on the vehicle may be accurately synchronized with the timing when the two imaging devices 20 capture images. This can further improve object recognition accuracy.

<2.8 Second Modification>

Figure 12:
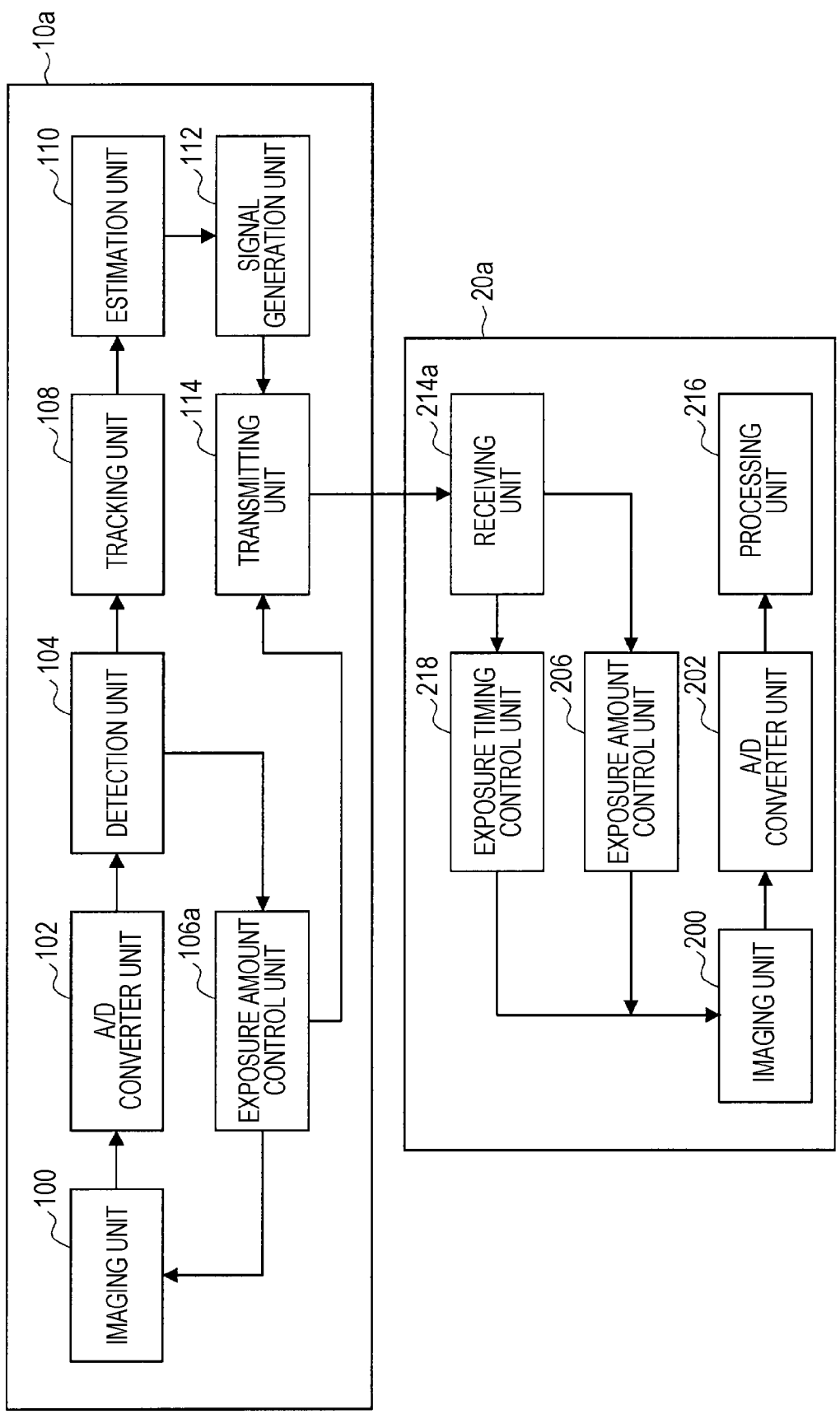
FIG. 12 is a block diagram of imaging devices 10*a* and 20*a* according to a second modification of the embodiment.

In the first embodiment described above, the imaging device 10 generates and transmits the timing signal to control the exposure timing of the imaging device 20. However, in the present embodiment, the imaging device 10 may transmit not only the timing signal to control the exposure timing of the imaging device 20, but also a signal to control the aperture and shutter speed of the imaging unit 200 of the imaging device 20. Details of the present modification will be described below with reference to FIG. 12. FIG. 12 is a block diagram of imaging devices 10*a* and 20*a* according to the modification of the present embodiment.

(Imaging Device 10*a*)

First, the imaging device 10*a* according to the present modification will be described with reference to FIG. 12. As shown in FIG. 12, similar to the imaging device 10, the imaging device 10*a* according to the present modification mainly includes the imaging unit 100, the A/D converter unit 102, the detection unit 104, an exposure amount control unit 106*a*, the tracking unit 108, the estimation unit 110, the signal generation unit 112, and the transmitting unit 114. Here, the imaging unit 100, the A/D converter unit 102, the detection unit 104, the tracking unit 108, the estimation unit 110, the signal generation unit 112, and the transmitting unit 114 are the same as those of the above-described imaging device 10, and thus will not be described, and only the exposure amount control unit 106*a* will be described.

—Exposure Amount Control Unit 106*a*—

The exposure amount control unit 106*a* detects the brightness of the object in a captured image, and on the basis of the detection result, controls the exposure amount of the imaging unit 100 described above, that is, the aperture, shutter time, etc. so that the brightness of the object in a captured image becomes appropriate. Moreover, the exposure amount control unit 106*a* generates an exposure control signal to control the exposure amount of the imaging unit 200 of the imaging device 20*a* as with the imaging unit 100, and outputs the generated exposure control signal to the transmitting unit 114.

(Imaging Device 20*a*)

Next, the imaging device 20*a* according to the present modification will be described with reference to FIG. 12. As shown in FIG. 12, similar to the imaging device 20, the imaging device 20*a* according to the present modification mainly includes the imaging unit 200, the A/D converter unit 202, the exposure amount control unit 206, a receiving unit 214*a*, the processing unit 216, and the exposure timing control unit 218. Here, the imaging unit 200, the A/D converter unit 202, the exposure amount control unit 206, the processing unit 216, and the exposure timing control unit 218 are the same as those of the above-described imaging device 20, and thus will not be described, and only the receiving unit 214*a* will be described.

—Receiving Unit 214*a*—

The receiving unit 214*a* not only outputs the timing signal from the imaging device 10*a* to the exposure timing control unit 218, but also outputs the exposure control signal from the imaging device 10*a* to the exposure amount control unit 206.

According to the present modification, the calculation of the exposure amount at the imaging device 20 is performed at the imaging device 10, and thus the calculation of the exposure amount at the imaging device 20 becomes unnecessary. Therefore, according to the present modification, the imaging device 20 can be made compact, and power consumption in the imaging device 20 can be reduced.

3. Second Embodiment

In the first embodiment described above, it is assumed that two or more imaging devices, the imaging devices 10 and 20, are used for implementation. However, the present embodiment is not limited to implementation with two or more imaging devices, and may be implemented with one imaging device. Thus, a second embodiment of the present disclosure using one imaging device 10*b* will be described.

<3.1 Configuration of Imaging Device>

Figure 13:
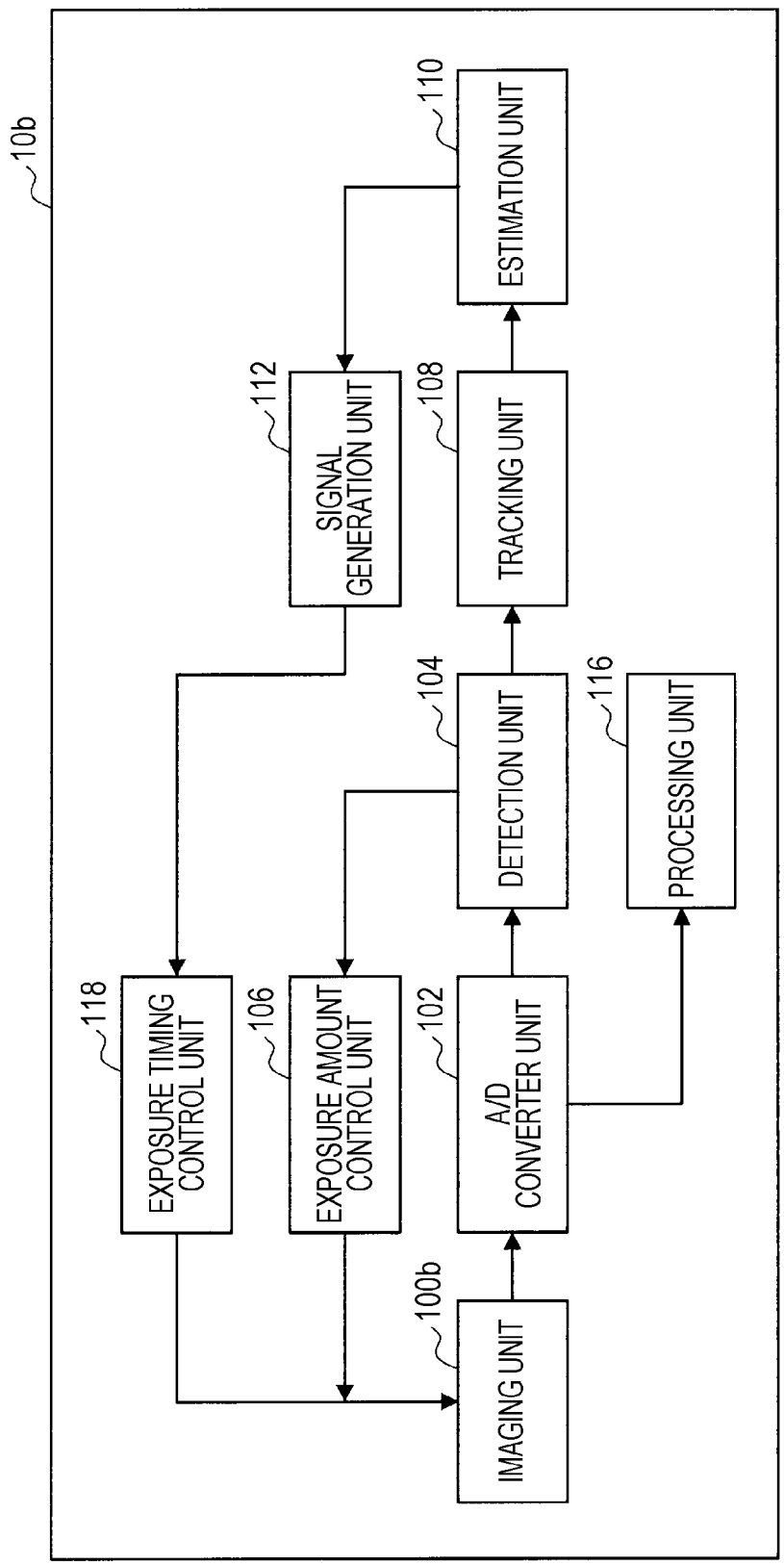
FIG. 13 is a block diagram of an imaging device 10*b* according to a second embodiment of the present disclosure.
Figure 14:
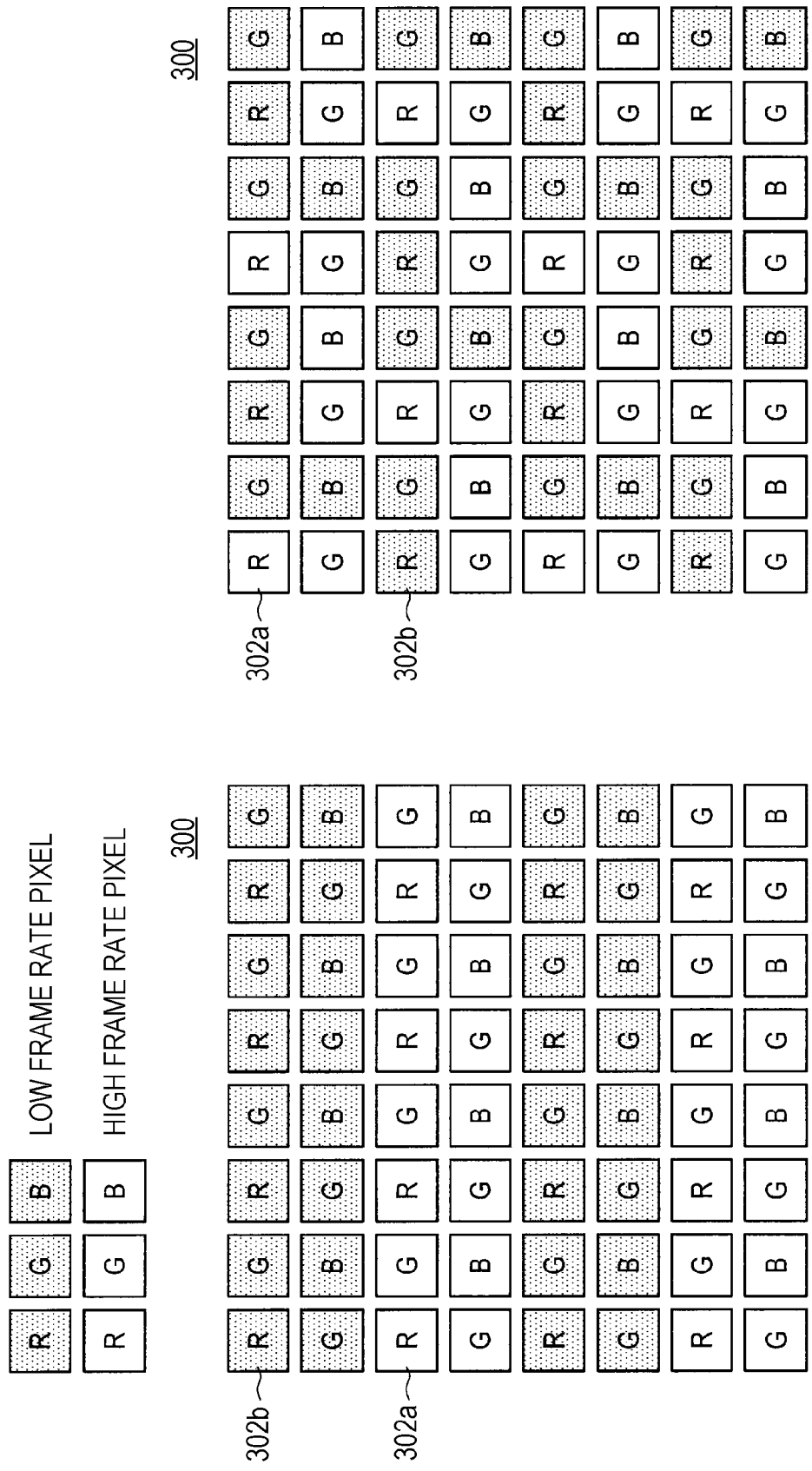
FIG. 14 is an explanatory diagram for explaining array examples of a solid-state image sensor array 300 of an imaging unit 100*b* according to the embodiment.

In the second embodiment of the present disclosure described below, the imaging device 10*b* is used to capture an object having a flicker phenomenon. First, the detailed configuration of the imaging device 10*b* according to the present embodiment will be described with reference to FIGS. 13 and 14. FIG. 13 is a block diagram of the imaging device 10*b* according to the present embodiment. FIG. 14 is an explanatory diagram for explaining array examples of a solid-state image sensor array 300 of an imaging unit 100*b* according to the present embodiment. Note that in FIG. 14, R indicates a pixel that detects red, G indicates a pixel that detects green, and B indicates a pixel that detects blue.

As shown in FIG. 13, the imaging device 10*b* according to the present embodiment mainly includes the imaging unit 100*b*, the A/D converter unit 102, the detection unit 104, the exposure amount control unit 106, the tracking unit 108, the estimation unit 110, the signal generation unit 112, the processing unit 116, and the exposure timing control unit 118. Note that in the imaging device 10*b*, the functional units are the same as the functional units having the same names of the imaging devices 10 and 20 according to the first embodiment described above, and thus the description of the functional units is omitted here.

Furthermore, as shown in FIG. 14, in the present embodiment, the solid-state image sensor array 300 is provided with a pixel group that captures images at a high frame rate (short-time exposure pixel group) (first imaging element group) 302*a*, and a pixel group that captures images at a low frame rate (long-time exposure pixel group) (second imaging element group) 302*b*, so that the functions of the imaging devices 10 and 20 can be implemented by the single imaging device 10*b*. In other words, in the present embodiment, in the single solid-state image sensor array 300, the pixels 302*a* that capture images at the high frame rate like those of the imaging device 10, and the pixels 302*b* that capture images at the low frame rate like those of the imaging device 20 are present. Then, the pixels 302*a* and the pixels 302*b* function like those of the imaging device 10 and the imaging device 20 according to the first embodiment described above, respectively, thereby enabling implementation with the single imaging device 10*b*.

Specifically, on the left side of FIG. 14, an example is shown in which the pixels 302*a* for the high frame rate and the pixels 302*b* for the low frame rate are alternately provided in two rows. Also, on the right side of FIG. 14, an example is shown in which the pixels 302*a* for the high frame rate and the pixels 302*b* for the low frame rate are randomly provided. Note that although the examples of FIG. 14 show RGB pixel arrays, each may be replaced with a BW array in the present embodiment. In this case, pixels 302 replaced with those of the BW array may be the pixels 302*a* for the high frame rate, or may be the pixels 302*b* for the low frame rate, or may be both the pixels 302. Furthermore, the solid-state image sensor array 300 according to the present embodiment is not limited to the examples shown in FIG. 14. Various arrays can be used as long as the two types of pixels 302a and 302b are included.

Then, the pixels 302a for the high frame rate of the solid-state image sensor array 300 in the pixel array as described above function similarly to those of the imaging unit 100 of the imaging device 10 in the first embodiment. That is, the imaging device 10b generates imaging frames on the basis of image signals acquired by the pixels 302a for the high frame rate, performs detection and tracking of the object, estimates period information of the flicker phenomenon, and generates a timing signal. Furthermore, the pixels 302b for the low frame rate of the solid-state image sensor array 300 are controlled by the above-described timing signal to capture images, and thus can capture the object being lit similar to the imaging unit 200 of the imaging device 20 in the first embodiment.

Note that in the present embodiment, a final captured image of the object, that is, an image of the object captured by the imaging device 20 in the first embodiment is generated using image signals acquired by the pixels 302b for the low frame rate. Alternatively, the captured image may be generated using image signals of both the pixels 302a for the high frame rate and the pixels 302b for the low frame rate. In this case, the obtained final captured image of the object is a high dynamic range (HDR) captured image having a wide contrast.

As described above, in the present embodiment, by providing the pixels 302a for the high frame rate and the pixels 302b for the low frame rate in the single solid-state image sensor array 300, the imaging device 10b, even singly, can capture the object being lit.

<3.2 Third Modification>

Figure 15:
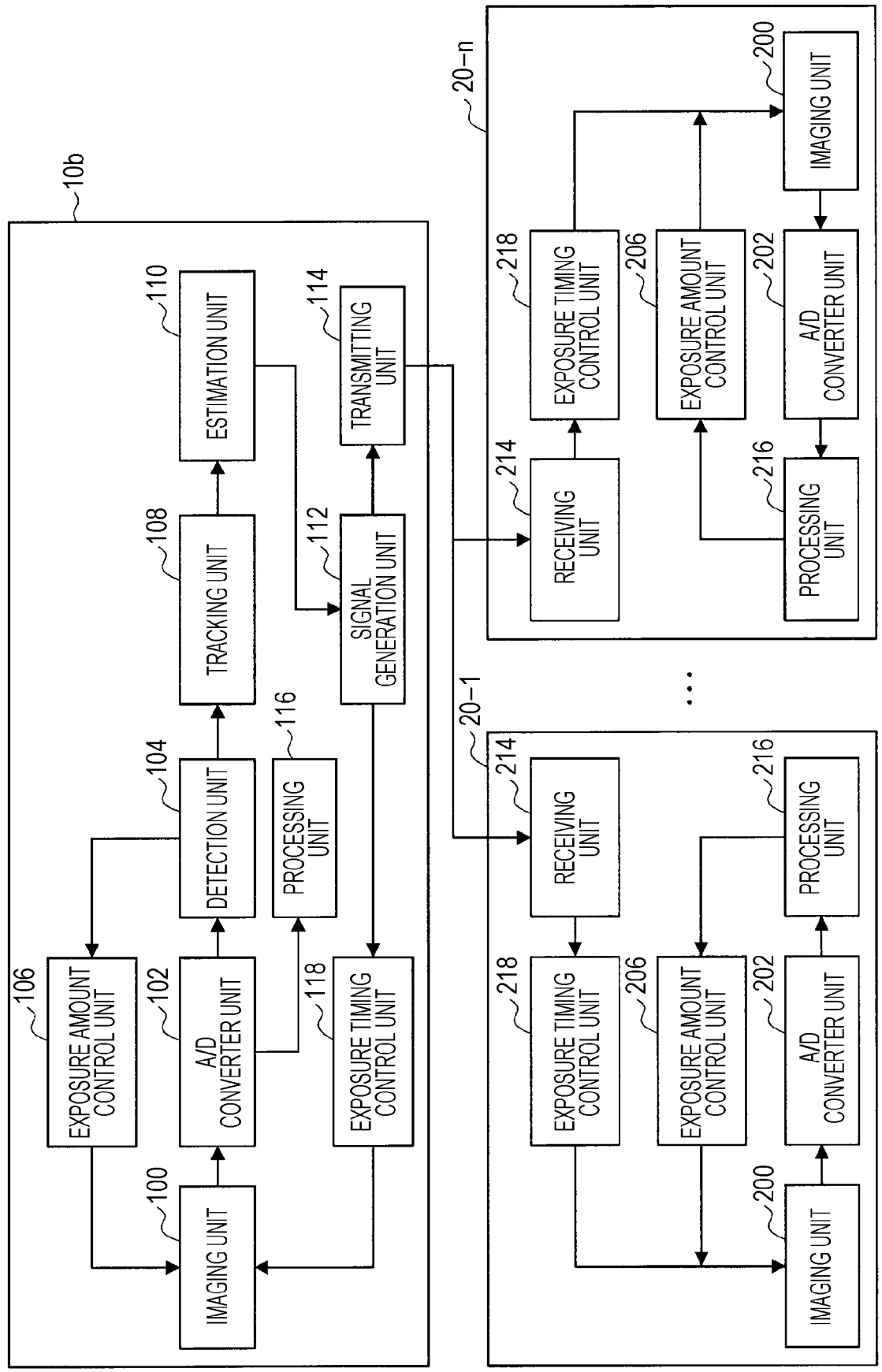
FIG. 15 is a block diagram of the imaging devices 10b and 20 according to a third modification of the embodiment.

In the second embodiment described above, it is aimed to capture one object. However, in the present embodiment, as in the first modification of the first embodiment, it may be aimed to capture a plurality of objects. Details of the present modification will be described below with reference to FIG. 15. FIG. 15 is a block diagram of the imaging devices 10b and 20 according to the modification of the present embodiment.

As shown in FIG. 15, in the present modification, the imaging device 10b is configured similarly to the imaging device 10b according to the second embodiment. Moreover, in the present modification, a plurality (n) of the imaging devices 20 according to the first embodiment is provided. Specifically, the imaging device 10b including the detection unit 104, the tracking unit 108, the estimation unit 110, and the signal generation unit 112 detects and tracks objects, estimates period information, and generates timing signals on the basis of the estimation results. Then, the timing signals generated at the imaging device 10b are transmitted to the corresponding imaging devices 20 and 20-n.

Note that in the present modification, final captured images of the plurality of objects are acquired at the imaging device 10b and the imaging devices 20-1 to 20-n.

4. Third Embodiment

Figure 16:
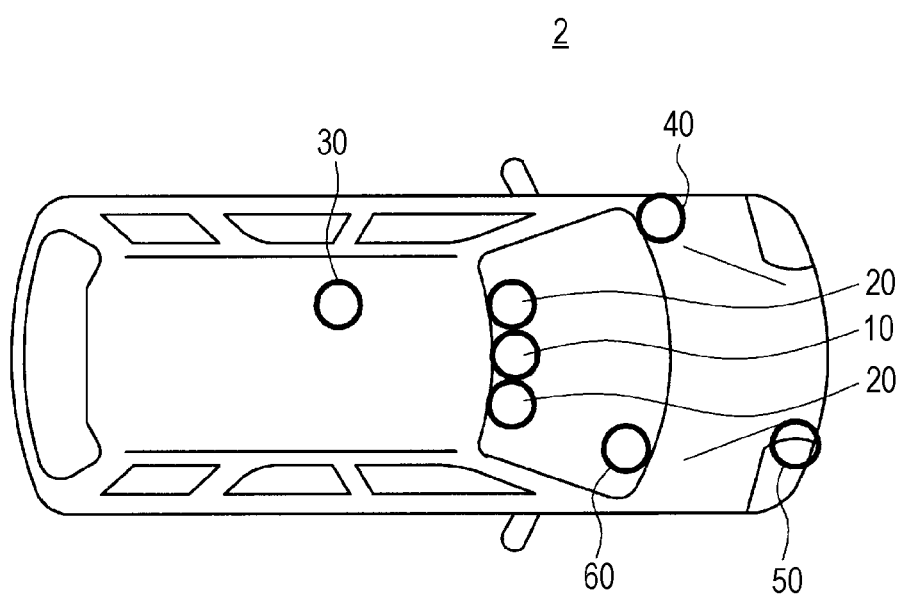
FIG. 16 is an explanatory diagram (the first one) illustrating an example of mounting of the imaging devices according to a third embodiment of the present disclosure.
Figure 17:
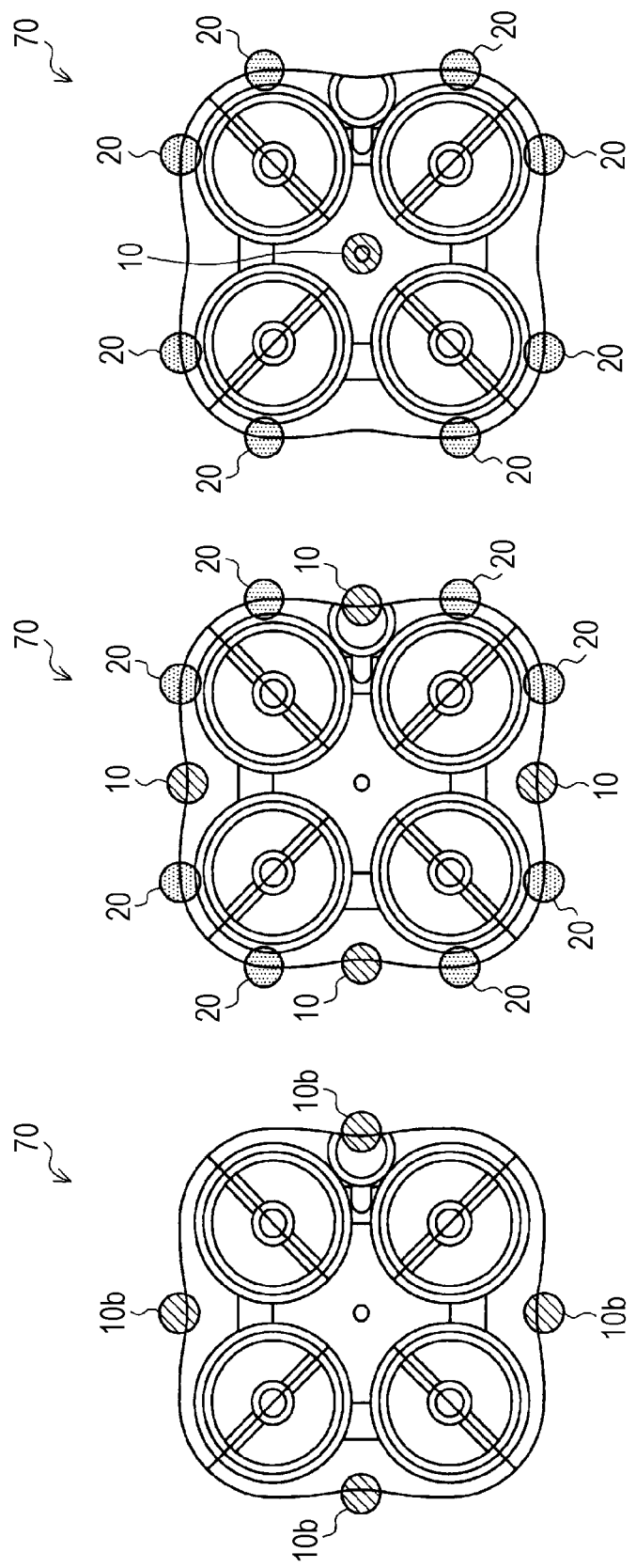
FIG. 17 is an explanatory diagram (the second one) illustrating examples of mounting of the imaging devices according to the embodiment.

Hereinafter, as a third embodiment of the present disclosure, an application example in which the imaging devices 10 and 20 according to the first and second embodiments described above are mounted on an apparatus such as a vehicle will be described with reference to FIGS. 16 and 17. FIGS. 16 and 17 are explanatory diagrams illustrating mounting examples of the imaging devices according to the third embodiment of the present disclosure.

First, with reference to FIG. 16, an example in which the imaging devices 10 and 20 according to the present embodiment are mounted on a passenger vehicle 2 will be described. For example, the imaging device 10 according to the present embodiment is provided at the upper center of the windshield of the passenger vehicle 2, and the two imaging devices 20 according to the present embodiment are provided on opposite sides of the imaging device 10. Moreover, the passenger vehicle 2 is provided with a positioning sensor 30, an acceleration sensor 40, the millimeter-wave radar 50, an illuminance sensor 60, etc. Specifically, the acceleration sensor 40 detects acceleration produced by the movement of the passenger vehicle 2. The millimeter-wave radar 50 radiates millimeter waves (e.g., radio waves having a wavelength of about 1 to 10 mm) around the vehicle, and detects reflected waves to detect, for example, a distance to an object around the passenger vehicle 2, or the like. The illuminance sensor 60 detects the brightness of the outside of the passenger vehicle 2.

For example, at the passenger vehicle 2, the imaging device 10 detects a coped object, performs tracking, and further estimates period information of a flicker phenomenon, generates timing signals, and transmits the timing signals to the two imaging devices 20. These two imaging devices 20 receive the timing signals, and capture the object on the basis of the received timing signals. Specifically, in a case where the imaging devices 20 image different objects, the timing signals are signals having different periods. Furthermore, in a case where the two imaging devices 20 measure the distance to one object, they are timing signals (synchronization signals) that allow the two imaging devices 20 to simultaneously capture the object. Moreover, capturing at the imaging devices 20 may be controlled using sensing data of the positioning sensor 30, the acceleration sensor 40, the millimeter-wave radar 50, the illuminance sensor 60, etc. as necessary.

Furthermore, in FIG. 16, the imaging devices 10 and 20 are provided at an upper part of the windshield of the passenger vehicle 2. However, in the present embodiment, they are not limited to being installed at such positions, and may be provided on the back side or the left and right sides of the passenger vehicle 2. For example, in a case where the imaging devices 10 and 20 are provided on the back side of the passenger vehicle 2, these imaging devices 10 and 20 can function as a monitoring system that captures the back of the passenger vehicle 2 in place of the rearview mirror, and can support the driver's driving.

Next, with reference to FIG. 17, an example will be described in which the imaging devices 10, 10b, and 20 according to the present embodiment are mounted on a drone 70. Here, the drone 70 is a small aircraft, and refers to an apparatus that has an autonomous flight function, an autonomous attitude control function, and the like without an operator on board because of its structure, and can fly in a three-dimensional space. For example, on the left side of FIG. 17, the drone 70 is shown on which four imaging devices 10b according to the second embodiment are mounted. Furthermore, in the center of FIG. 17, the drone 70 is shown on which four imaging devices 10 according to the first embodiment and eight imaging devices 20 according to the same embodiment are mounted. Moreover, on the right side of FIG. 17, the drone 70 is shown on which one imaging device 10 according to the first embodiment and eight imaging devices 20 according to the same embodiment are mounted.

Specifically, on the drone 70 on the left side of FIG. 17, the imaging devices 10b are provided at the centers of the sides of the drone 70, and objects located in different directions as viewed from the drone 70 can be imaged by the imaging devices 10b.

Furthermore, at the drone 70 in the center of FIG. 17, the imaging devices 10 each have a wide-angle imaging unit 100 having an angle of view of nearly 180 degrees, and are provided at the centers of the sides of the drone 70. Moreover, each imaging device 10 controls a pair of imaging devices 20 positioned on the opposite sides of the imaging device 10. For example, the pair of imaging devices 20 are controlled by the imaging device 10 to be synchronized with each other, and can perform measurement of distance to an object.

Furthermore, at the drone 70 on the right side of FIG. 17, the imaging device 10 has a wide-angle imaging unit 100 having an angle of view of nearly 360 degrees, and is provided at the top center of the drone 70. Moreover, the imaging device 10 controls the eight imaging devices 20 positioned around the imaging device 10.

As described above, the imaging device according to the embodiments of the present disclosure can be mounted, as a device for monitoring surroundings, on a spatially movable apparatus such as the passenger vehicle 2, the drone 70, or an industrial or home robot that is remotely operated by an operator or can move autonomously. Moreover, the imaging device is not limited to being limited to being mounted on such an apparatus, and for example, because of its capability of high-speed capturing, may be mounted on an analysis apparatus capable of analyzing an object such as analyzing a phenomenon varying at high speed that is difficult to observe with human eyes. More specifically, examples of the analysis apparatus include measurement devices used for analysis of an object drop or impact test, an explosion test, or the like, analysis of an athlete's motion, and the like.

5. Summary

As described above, in the embodiments of the present disclosure, changes in the brightness of an object in a plurality of imaging frames are detected by tracking the object, and period information of a flicker phenomenon (blinking) of the object is estimated on the basis of the detected changes in the brightness. According to the present embodiment, since the object is tracked, changes in the brightness of the object can be captured with high accuracy, and further, the period information can be estimated with high accuracy. Then, in the embodiments, a timing signal for capturing the object appropriately is generated on the basis of the estimated period information, and the object is imaged on the basis of the timing signal, so that an optimal captured image that can further ensure the recognition of the object can be acquired. Moreover, in the present embodiment, since the period information is estimated quickly using imaging frames obtained at the high frame rate to generate the timing signal, the imaging device 20 can capture the object in real time.

Note that the above-described first to third embodiments and modifications may be implemented singly or may be implemented in combination with each other.

6. Supplement

The steps in the imaging method of the above-described embodiments do not necessarily have to be processed in the described order. For example, the steps may be processed in an appropriately changed order. Alternatively, the steps may be processed partly in parallel or individually, instead of being processed in time series. Moreover, the processing in the steps does not necessarily have to be processed in accordance with the described method, and may be processed by other methods by other functional blocks, for example.

Furthermore, although the preferred embodiments of the present disclosure have been described in detail with reference to the accompanying drawings, the technical scope of the present disclosure is not limited to these examples. It is obvious that a person having ordinary knowledge in the technical field of the present disclosure can arrive at various alterations or modifications within the scope of the technical idea described in the claims. These are, of course, considered to belong to the technical scope of the present disclosure.

Moreover, the effects described in the present description are merely illustrative or exemplary and are not limiting. That is, the technique according to the present disclosure can achieve other effects that are obvious to those skilled in the art from the description of the present description in addition to the above effects, or in place of the above effects.

Note that the following configurations also belong to the technical scope of the present disclosure.

(1)

An imaging device including:

a detection unit that detects a blinking object or an object lit by a blinking illuminator;

a tracking unit that performs tracking on the detected object;

an estimation unit that estimates period information of the blinking, on the basis of a plurality of imaging frames of the tracked object; and a signal generation unit that generates a timing signal for capturing the object, on the basis of an estimation result.

(2)

The imaging device according to (1) above, further including first and second imaging units that capture the object, in which the first imaging unit captures images at a first frame rate, and the second imaging unit captures images at a second frame rate lower than the first frame rate.

(3)

The imaging device according to (1) above, further including an imaging unit that captures the object and includes a plurality of imaging elements, in which the imaging unit includes a first imaging element group that captures images at a first frame rate, and a second imaging element group that captures images at a second frame rate lower than the first frame rate.

(4)

The imaging device according to (2) or (3) above, in which the detection unit detects the object, on the basis of a plurality of imaging frames of the object acquired at the first frame rate.

(5)

The imaging device according to (4) above, in which the detection unit detects the object, on the basis of color information of pixels of the imaging frames.

(6)

The imaging device according to (4) above, in which the detection unit detects the object, on the basis of a characteristic point of the imaging frames.

(7)

The imaging device according to any one of (1) to (3) above, further including a positioning unit that determines a position of the imaging device, in which the detection unit detects the object, on the basis of position information of the imaging device.

(8)

The imaging device according to (2) or (3) above, in which the tracking unit performs tracking on the object, on the basis of a comparison of two successive imaging frames of a plurality of imaging frames of the object acquired at the first frame rate.

(9)

The imaging device according to (2) or (3) above, in which the estimation unit estimates at least one of a frequency, a lighting time, or a lighting interval of the blinking, on the basis of changes in brightness of the object in a plurality of imaging frames of the object acquired at the first frame rate.

(10)

The imaging device according to (2) above, in which the signal generation unit generates a signal to control timing of exposure start at the second imaging unit or a signal to control timing of exposure end.

(11)

The imaging device according to (1) above, in which the detection unit detects a plurality of the objects, the tracking unit performs tracking on the objects, the estimation unit estimates period information of the blinking associated with the objects, and the signal generation unit generates timing signals for capturing the objects, on the basis of estimation results.

(12)

An apparatus that is spatially movable or can analyze a blinking object or an object lit by a blinking illuminator, and is equipped with an imaging device including:

a detection unit that detects the object;

a tracking unit that performs tracking on the detected object;

an estimation unit that estimates period information of the blinking, on the basis of a plurality of imaging frames of the tracked object; and a signal generation unit that generates a timing signal for capturing the object, on the basis of an estimation result.

REFERENCE SIGNS LIST

1 Self-luminous traffic sign
2 Passenger vehicle
3 Gymnasium
10, 10a, 10b, 10c, 20, 20a, 20-1 to 20-n Imaging device
30 Positioning sensor
40 Acceleration sensor
50 Millimeter-wave radar
60 Illuminance sensor
70 Drone
80 Lighting device
90 Athlete
100, 100b, 200 Imaging unit
102, 202 A/D converter unit
104 Detection unit
106, 106a, 206 Exposure amount control unit
108 Tracking unit
110 Estimation unit
112 Signal generation unit
114 Transmitting unit
116, 216 Processing unit
118, 218 Exposure timing control unit
214, 214a Receiving unit
300 Solid-state image sensor array
302, 302a, 302b Pixel

The invention claimed is:

1. An imaging device comprising:
a first imaging unit that captures images at a first frame rate;
a detection unit that detects a blinking object or an object lit by a blinking illuminator;
a tracking unit that performs tracking on the detected object;
an estimation unit that estimates period information of the blinking, on a basis of a plurality of imaging frames of the tracked object;
a signal generation unit that generates a timing signal for capturing the object, on a basis of an estimation result; and
a transmitting unit that transmits the timing signal to a second imaging device comprising a second imaging unit, wherein the second imaging unit captures images at a second frame rate, different from the first frame rate, based on the timing signal.

2. The imaging device according to claim 1, wherein the second frame rate is lower than the first frame rate.

3. The imaging device according to claim 2, wherein the detection unit detects the object, on a basis of a plurality of imaging frames of the object acquired at the first frame rate.

4. The imaging device according to claim 3, wherein the detection unit detects the object, on a basis of color information of pixels of the imaging frames.

5. The imaging device according to claim 3, wherein the detection unit detects the object, on a basis of a characteristic point of the imaging frames.

6. The imaging device according to claim 1, further comprising a positioning unit that determines a position of the imaging device, wherein
the detection unit detects the object, on a basis of position information of the imaging device.

7. The imaging device according to claim 2, wherein the tracking unit performs tracking on the object, on a basis of a comparison of two successive imaging frames of a plurality of imaging frames of the object acquired at the first frame rate.

8. The imaging device according to claim 2, wherein the estimation unit estimates at least one of a frequency, a lighting time, or a lighting interval of the blinking, on a basis of changes in brightness of the object in a plurality of imaging frames of the object acquired at the first frame rate.

9. The imaging device according to claim 2, wherein the signal generation unit generates a signal to control timing of exposure start at the second imaging unit or a signal to control timing of exposure end.

10. The imaging device according to claim 1, wherein
the detection unit detects a plurality of the objects,
the tracking unit performs tracking on the objects,
the estimation unit estimates period information of the blinking associated with the objects, and
the signal generation unit generates timing signals for capturing the objects, on a basis of estimation results.

11. An apparatus that is spatially movable or can analyze a blinking object or an object lit by a blinking illuminator, while moving through space, and is equipped with an imaging device comprising:
a first imaging unit that captures images at a first frame rate;
a detection unit that, while moving through space, detects the object;
a tracking unit that, while moving through space, performs tracking on the detected object;

an estimation unit that estimates period information of the blinking, on a basis of a plurality of imaging frames of the tracked object;

a signal generation unit that generates a timing signal for capturing the object, on a basis of an estimation result; and a transmitting unit that transmits the timing signal to a second imaging device comprising a second imaging unit, wherein the second imaging unit captures images at a second frame rate, different from the first frame rate, based on the timing signal.

12. The imaging device according to claim 11, wherein the second frame rate is lower than the first frame rate.

13. The imaging device according to claim 12, wherein the detection unit detects the object, on a basis of a plurality of imaging frames of the object acquired at the first frame rate.

14. The imaging device according to claim 13, wherein the detection unit detects the object, on a basis of color information of pixels of the imaging frames.

15. An imaging device comprising:
a first imager that captures images at a first frame rate;
detection circuitry that detects a blinking object;
tracking circuitry that performs tracking on the detected object;
estimation circuitry that estimates period information of the blinking, on a basis of a plurality of imaging frames of the tracked object;
signal generation circuitry that generates a timing signal for capturing the object, on a basis of an estimation result; and
a transmitter that transmits the timing signal to a second imaging device comprising a second imager, wherein the second imager captures images at a second frame rate, different from the first frame rate, based on the timing signal.

16. The imaging device according to claim 15, wherein the second frame rate is lower than the first frame rate.

17. The imaging device according to claim 15, wherein the detection circuitry detects the object, on a basis of a plurality of imaging frames of the object acquired at the first frame rate.

* * * * *